United States Patent
Mulvaney et al.

(10) Patent No.: US 10,953,942 B2
(45) Date of Patent: Mar. 23, 2021

(54) BICYCLE LIGHT SYSTEMS AND METHODS

(71) Applicant: ShineOn Safety Technologies LLC, Longmont, CO (US)

(72) Inventors: Alex Mulvaney, Boulder, CO (US); Katherine Vega, Boulder, CO (US)

(73) Assignee: ShineOn Safety Technologies LLC, Longmont, CO (US)

( * ) Notice: Subject to any disclaimer, the term of this patent is extended or adjusted under 35 U.S.C. 154(b) by 0 days.

(21) Appl. No.: 16/797,644

(22) Filed: Feb. 21, 2020

(65) Prior Publication Data

US 2020/0269943 A1 Aug. 27, 2020

Related U.S. Application Data

(60) Provisional application No. 62/809,201, filed on Feb. 22, 2019.

(51) Int. Cl.
| | |
|---|---|
| *B62J 6/023* | (2020.01) |
| *F21S 41/125* | (2018.01) |
| *B62J 6/027* | (2020.01) |
| *F21Y 115/10* | (2016.01) |

(52) U.S. Cl.
CPC ............... *B62J 6/023* (2020.02); *B62J 6/027* (2020.02); *F21S 41/125* (2018.01); *F21Y 2115/10* (2016.08)

(58) Field of Classification Search
CPC ............... F21S 41/10–125; B62J 6/02–045
See application file for complete search history.

(56) References Cited

U.S. PATENT DOCUMENTS

| | | | | |
|---|---|---|---|---|
| 2,694,138 | A | * | 11/1954 | Schwinn ............... B62J 6/00 362/102 |
| 4,049,959 | A | | 9/1977 | Ledterman |
| 5,072,339 | A | | 12/1991 | Shimojo |
| 7,722,231 | B2 | | 5/2010 | Carillo |
| D760,931 | S | | 7/2016 | Davies |
| 10,239,445 | B1 | * | 3/2019 | Hendricks ............ H04N 9/3182 |

FOREIGN PATENT DOCUMENTS

| | | | |
|---|---|---|---|
| CN | 103723218 A | | 4/2014 |
| CN | 203612121 U | | 5/2014 |
| DE | 102011002894 A1 | | 7/2012 |
| GB | 2336658 B | | 3/2002 |
| GB | 2568113 A | * | 5/2019 ............. B62J 6/020 |

* cited by examiner

*Primary Examiner* — Mariceli Santiago
(74) *Attorney, Agent, or Firm* — Acuity IP, LLC; Nathan S. Cassell

(57) ABSTRACT

Bicycle light systems and methods operate to project multicolor lighting patterns on the front and/or rear of the torso of a bicycle rider. Multicolor light schemes provide increased visibility, accentuate the rider's form, and provide the rider with an enjoyable and thrilling riding experience. Low light intensity configurations effectively operate to light the rider's body while not shining excessive amounts of light other riders. Light housing configurations prevent unwanted light from reaching the rider's eyes, and limit the illumination patterns to desired locations on the rider's torso.

18 Claims, 16 Drawing Sheets

BICYCLE LIGHT SYSTEMS AND METHODS

CROSS-REFERENCES TO RELATED APPLICATIONS

This application claims the benefit of U.S. Provisional Patent Application No. 62/809,201 filed Feb. 22, 2019, the content of which is incorporated herein by reference.

BACKGROUND

Bicycle lights are useful safety devices that operate to illuminate the roadway so that the bicycle rider can better see the path in front of them. Bicycle lights also enhance the visibility of the bicycle and rider so that others traveling on the roadway can easily see the bicycle and rider. Although a variety of bicycle lights are currently available, there is an ongoing need for improved bicycle light systems and methods. Embodiments of the present invention provide solutions to at least some of these outstanding needs.

BRIEF SUMMARY

Embodiments disclosed herein encompass systems and methods for illuminating objects in front of a bicycle such the roadway and traffic signs, and also for illuminating the bicycle rider.

Advantageously, bicycle light systems and methods disclosed herein provide small, aerodynamically shaped lighting solutions for bicyclists. Exemplary bicycle light systems are easy to mount on the handlebars of a bicycle, and easy to remove. The systems are also easy to charge using standard USB or other plug configurations. Further, the systems provide user-friendly operation, allowing the user or operator to turn the bicycle light on and off, and to cycle through the various operating modes.

An exemplary bicycle light system provides both forward illumination onto the path of the bicycle, and rear-illumination onto the rider's body. The bicycle light system can accomplish this by shining light both forwards and backwards. In exemplary embodiments, a bicycle light system will include one or more light sources on both the front and the back of the device. In some cases, a bicycle light system can be mounted on or coupled with the handlebars or some other part of the front of a bicycle, and can illuminate the front of the rider and the forward path. In some cases, a bicycle light system can be mounted on or coupled with the seat or some other part of the rear of a bicycle, and can illuminate the back of the rider and a space behind the bicycle. Bicycle light systems as disclosed herein can provide greatly increased visibility of the rider, and in some lighting conditions can make the rider hundreds of times more visible as compared with a standard bicycle light. Such results can be accomplished without mounting additional lights directly on the rider, as is required with lighted vests worn by the rider. The illumination provided by exemplary bicycle light systems disclosed herein can be active illumination as contrasted to a reflective vest. In some cases, bicycle light systems disclosed herein can be used in conjunction with a reflective vest for great effect. Methods of manufacturing bicycle light systems can include designing a printed circuit board (PCB) to contain the desired electronics, and mounting the PCB inside a housing with one or more lights protruding in the respective desired direction(s). A PCB or other computer components of a bicycle light system can be programmed to implement various light flashing sequences and/or patterns.

In one aspect, embodiments of the present invention encompass a bicycle light system. An exemplary bicycle light system may include a multicolor light assembly, a housing unit, a power source such as a battery, and a mount. The multicolor light assembly can operate to project a first light pattern having a first light color and a second light pattern having a second light color. The housing unit can operate to support the multicolor light assembly and the battery. The mount can operate to secure the housing unit to a bicycle. In some cases, the multicolor light assembly projects the first light pattern and the second light pattern having a second light color toward the front torso of a person riding the bicycle. bicycle. In some cases, the multicolor light assembly projects the first light pattern and the second light pattern having a second light color toward the rear torso of a person riding the bicycle.

In some aspects, a bicycle light system may include a multicolor light assembly, a housing unit, and a mount. In some cases, the multicolor light assembly can operate to project a first light pattern and a second light pattern toward a torso of a person riding a bicycle, where the first light pattern has a first light color and the second light pattern has a second light color. In some cases, the housing unit operates to support the multicolor light assembly. In some cases, the mount operates to secure the housing unit to the bicycle. According to some embodiments, the torso is a front torso of the person, and the multicolor light assembly projects the first light pattern and the second light pattern toward the front torso of the person riding the bicycle. According to some embodiments, the torso is a rear torso of the person, and the multicolor light assembly projects the first light pattern and the second light pattern toward the rear torso of the person riding the bicycle. In some cases, the multicolor light assembly projects a third light pattern toward the torso of a person riding the bicycle, where the third light pattern has a third light color. In some cases, the first light color is red, the second light color is green, and the third light color is blue. In some cases, the multicolor light assembly projects the first light pattern and the second light pattern to produce an illumination pattern on the torso of the person riding the bicycle, and the illumination pattern includes a red zone provided by the first light pattern, a green zone provided by the second light pattern, and a yellow zone provided by an overlap of the first light pattern and the second light pattern. In some cases, the multicolor light assembly projects the first light pattern and the second light pattern to produce an illumination pattern on the torso of the person riding the bicycle, and the illumination pattern includes a red zone provided by the first light pattern, a blue zone provided by the second light pattern, and a magenta zone provided by an overlap of the first light pattern and the second light pattern. In some cases, the multicolor light assembly projects the first light pattern and the second light pattern to produce an illumination pattern on the torso of the person riding the bicycle, and the illumination pattern includes a green zone provided by the first light pattern, a blue zone provided by the second light pattern, and a cyan zone provided by an overlap of the first light pattern and the second light pattern.

In some cases, the multicolor light assembly projects the first light pattern, the second light pattern, and the third light pattern to produce an illumination pattern on the torso of the person riding the bicycle, and the illumination pattern includes a red zone provided by the first light pattern, a green zone provided by the second light pattern, a blue zone provided by the third light pattern and a white zone provided by an overlap of the first light pattern, second light pattern, and third light pattern. In some cases, the multicolor light assembly projects the first light pattern, the second light pattern, and the third light pattern to produce an illumination pattern on the torso of the person riding the bicycle, and the illumination pattern includes a red zone provided by the first light pattern, a green zone provided by the second light pattern, a blue zone provided b the third light pattern, a yellow zone provided by an overlap of the first light pattern and the second light pattern, a magenta zone provided by an overlap of the first light pattern and the third light pattern, a cyan zone provided by an overlap of the second light pattern and the third light pattern, and a white zone provided by an overlap of the first light pattern, second light pattern, and third light pattern. In some cases, the multicolor light assembly projects the first light pattern, the second light pattern, and the third light pattern to produce an illumination pattern on the torso of the person riding the bicycle, and the illumination pattern includes a red zone provided by the first light pattern, a green zone provided by the second light pattern, a blue zone provided by the third light pattern, a yellow zone provided by an overlap of the first light pattern and the second light pattern, a magenta zone provided by an overlap of the first light pattern and the third light pattern, and a white zone provided by an overlap of the first light pattern, second light pattern, and third light pattern. In some cases, the multicolor light assembly projects the first light pattern, the second light pattern, and the third light pattern to produce an illumination pattern on a front torso of a person riding the bicycle, and the illumination pattern includes a red zone provided by the first light pattern, a green zone provided by the second light pattern, a blue zone provided by the third light pattern, a yellow zone provided by an overlap of the first light pattern and the second light pattern, a cyan zone provided by an overlap of the second light pattern and the third light pattern, and a white zone provided by an overlap of the first light pattern, second light pattern, and third light pattern. In some cases, the multicolor light assembly projects the first light pattern, the second light pattern, and the third light pattern to produce an illumination pattern on a front torso of a person riding the bicycle, and the illumination pattern includes a red zone provided by the first light pattern, a green zone provided by the second light pattern, a blue zone provided by the third light pattern, a cyan zone provided by an overlap of the second light pattern and the third light pattern, a magenta zone provided by an overlap of the first light pattern and the third light pattern, and a white zone provided by an overlap of the first light pattern, second light pattern, and third light pattern.

In some; cases, the multicolor light assembly includes an LED light. In some cases, the LED light is a 5 mm RGB LED common cathode. In some cases, the LED light provides a uniform light output. In some cases, the LED light is insulation compatible. In some cases, the LED light includes a red, green, and blue LED light source. In some cases, the red LED light source includes AlGaInP on GaAs substrate, the green light source includes InGaN on GaAs substrate, and the blue light source includes InGaAlN on GaAs substrate. In some cases, a bicycle light system includes a power source. In some cases, a power source can include a battery. In some cases, a power source can include a rechargeable battery.

In another aspect, embodiments of the present invention encompass bicycle light systems having a light assembly that projects 6 lumens or less, a housing unit that supports the light assembly, and a mount that secures the housing unit to a bicycle. In some cases, the light assembly operates to project toward a front torso of a person riding the bicycle. In some cases, the light assembly operates to project toward a rear torso of a person riding the bicycle. In some cases, the light assembly includes an LED light. In some cases, the LED light is a red, green and blue LED light that projects a maximum of 20 milliamps. In some cases, the LED light is a red, green and blue LED light that projects less than 20 milliamps. In some cases, the LED light is a red, green and blue LED light that projects red light having an illumination intensity value within a range from 1 to 2 lumens, green light having an illumination intensity value within a range from 1 to 2 lumens, and blue light having an illumination intensity value within a range from 1 to 2 lumens. In some cases, the LED light is a red, green and blue LED light that projects light having an illumination intensity value of 5 lumens.

In still another aspect, embodiments of the present invention encompass bicycle light systems having a light assembly, a housing unit for the light assembly that limits the light projection, and a mount that secures the housing unit to a bicycle. In some cases, the light assembly projects toward the front torso of a person riding the bicycle. In some cases, the light assembly projects toward the rear torso of a person riding the bicycle. In some cases, the housing unit provides a light projection beam angle and hood shape that limits the light projection. In some cases, a light projection beam angle and hood shape of the housing unit allows light to be projected toward the rider's body in such a way that a greater portion of the light projects onto the rider's body, and a lesser portion of light shines outside of the profile of the rider's body. In some cases, the housing unit provides a light projection beam angle and hood shape that does not allow projected light to extend above the rider's shoulders and into the face. In some cases, the light projection beam angle and hood shape restricts horizontal direction to illuminate the rider's arms but no farther. In some cases, the housing unit provides a light projection beam angle and hood shape that allows the LED to have a 100 degree+ field of view. In some cases, the housing unit provides a light projection beam angle and hood shape that allows the light to not be restricted in the lower direction. In some cases, the housing unit provides a light projection beam angle and hood shape to deliver light projection in a square shape from the rider's shoulders to their arms to down to the waist. In some cases, the housing unit provides a light projection beam angle and hood shape that prevent the light from projecting rearward toward the rider's eyes. In some cases, the light assembly projects a first light pattern having a first light color, a second light pattern having a second light color, a third light pattern having a third light color, a fourth light pattern having a fourth color, a fifth light pattern having a fifth light color, a sixth light pattern having a sixth light color, and a seventh light pattern having a seventh light color. In some cases, the first light color is red, the second light color is green, the third light color is blue, the fourth light color is red/blue (magenta), the fifth light color is red/green (yellow), the sixth light color is blue/green (cyan), and the seventh light color is red/blue/green (white).

BRIEF DESCRIPTION OF THE DRAWINGS

A better understanding of the features and advantages of the provided system and methods will be obtained by reference to the following detailed description that sets forth illustrative embodiments, in which the principles of the invention are utilized, and the accompanying drawings of which.

DETAILED DESCRIPTION

Figure 1A:
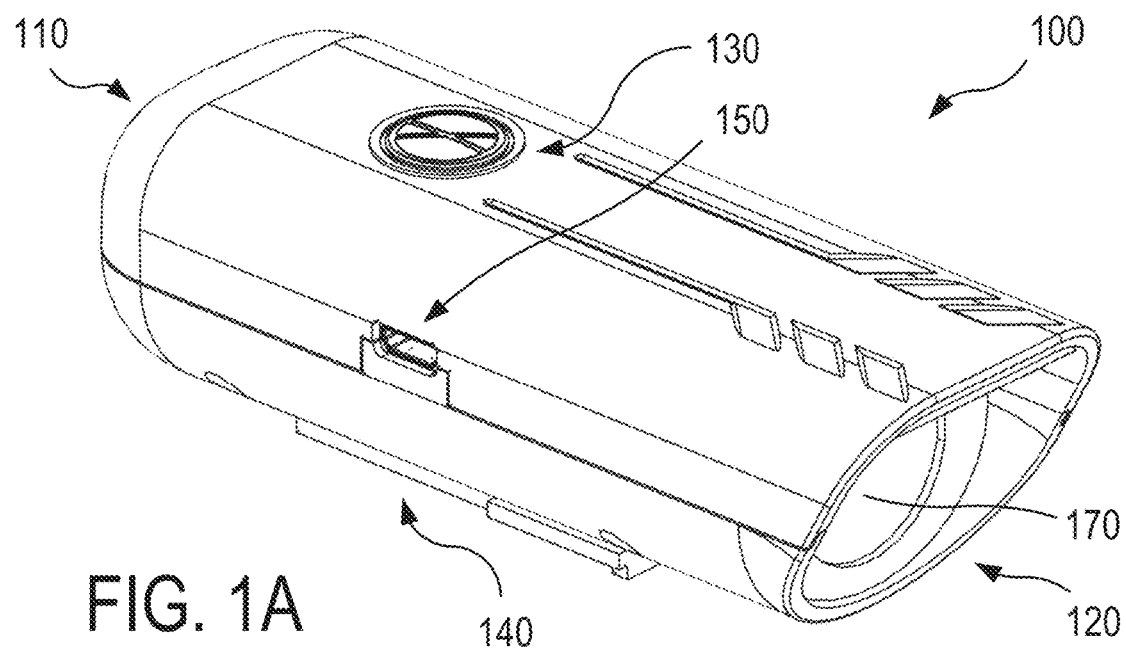
FIGS. 1A to 1C depict aspects of exemplary bicycle light systems and methods, according to embodiments of the present invention.

Embodiments of the present invention encompass systems and methods for providing forward illumination onto the path of a bicycle, rearward illumination onto the front of a rider's body, forward illumination onto the back of a rider's body, and/or rearward illumination toward the space behind a bicycle.

Light Colors

Standard front bicycle lights include a device mounted on the front a bicycle, where the device includes a forward-facing white light. Standard rear bicycle lights include a device mounted on the rear of a bicycle, where the device includes a rearward-facing red light. Embodiments of the present invention encompass bicolor, tricolor, and other multicolor light schemes which provide increased visibility. For example, a red-blue-green (RBG) tricolor pattern can shine onto the rider's torso and greatly increase visibility. Such bicycle lighting schemes are eye catching and accentuate the rider's form, and also provide the rider with an enjoyable and thrilling riding experience.

Intensity

Bicycle light systems and methods as disclosed herein provide illumination in a rearward direction onto the front of the rider's body, as well as in a forward direction toward the oncoming road pathway. Compared with standard bicycle lights that are extremely bright and provide high amounts of light, exemplary bicycle light systems and methods disclosed herein can use much less light, while at the same time keeping the rider safe. A typical road light can be 500 lumens which is standard for an adequate road light (most cyclists say that 500 is enough/plenty to light the path, and the need or desire for more lumens is only to feel safer or for night mountain biking). Embodiments of the present invention can provide the same visibility as a 1500 lumen light by using less than 5 lumens directed back against the rider. Embodiments of the present invention can accomplish that by using less light more effectively, by lighting the rider's body and not blinding other riders with light. According to some embodiments, a light that shines back against the rider can be less bright. In some cases, light projected backward toward the front of the rider can be partially blocked by a shield or other element as discussed elsewhere herein. The light projected toward the rider can reflect off of the rider themselves. In contrast to the lower light levels provided by embodiments of the present invention, a very bright light shining toward the rider will reduce night vision even if it does not directly shine into the rider's face. Embodiments of the present invention provide lights that project toward the rider, and that put out much less lumens (as compared to standard lights) while shining them onto the rider's body directly. These lower light embodiments are contrary to conventional wisdom which states that more light provides a safer product.

Beam Angle and Hood Shape

Embodiments of the present invention provide light that is projected toward the rider's body in such a way that a significant portion of the light projects onto the rider's body, and a lower portion of light shines outside of the profile of the rider's body. This feature can operate to increase safety of all cyclists at night, by projecting little or no light toward the eyes of other riders. In some embodiments, the light does not extend above the rider's shoulders and into the face. In some embodiments, the light is restricted in the horizontal direction to illuminate the riders arms but no farther, so as to prevent light shining into other riders eyes behind the user of the instant bicycle light system. According to some embodiments, an LED has a 100 degree+ field of view, and therefore the bicycle light system can operate to restrict this light in horizontal angle. In some cases, the light may not be restricted in the lower direction, as light can help if the legs are illuminated, but this may be to very little effect of forward visibility from a handlebar mounting point. According to some embodiments, one objective is to provide light as close to the human form, for example in a square shape from the rider's shoulders to their arms and down to the waist. According to some embodiments, a bicycle light system can be configured so that housing unit shape blocks the light from shining outside this human torso shape by means of physically blocking the light coming from the LED.

Figure 1B:
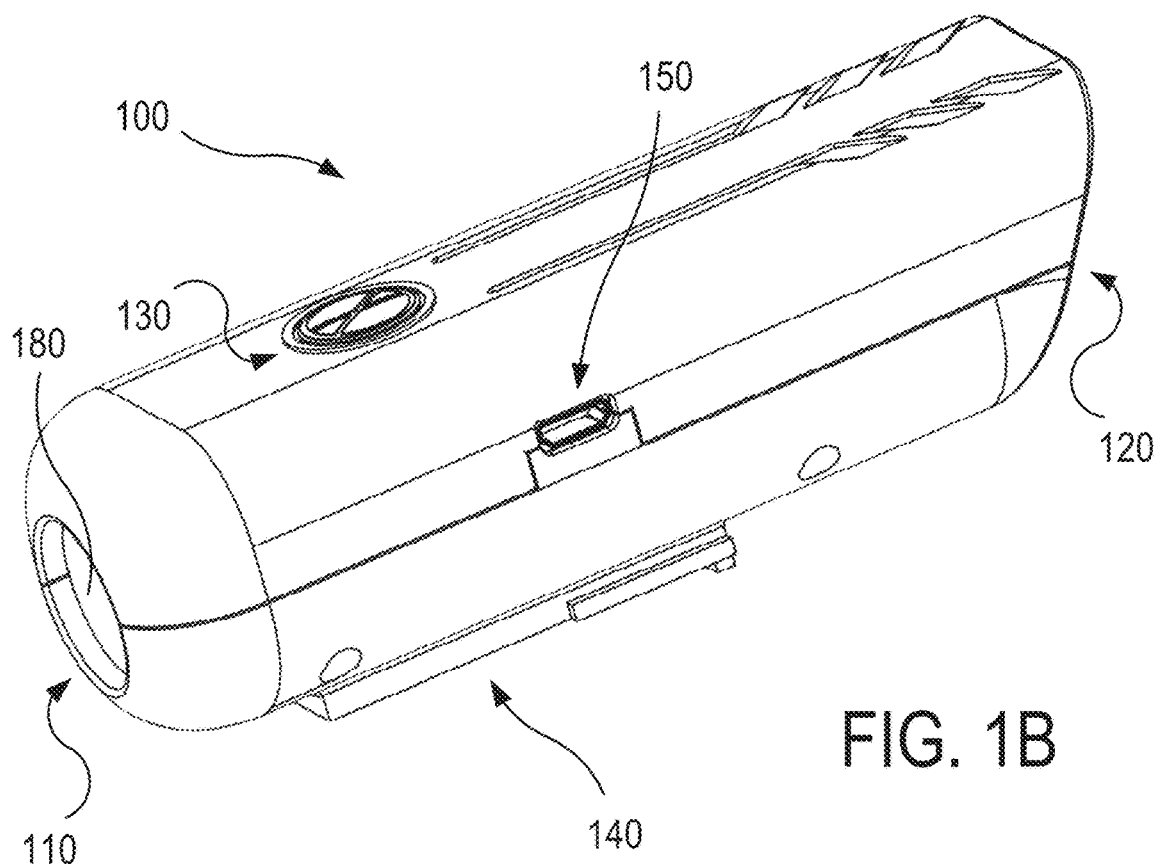
Figure 1C:
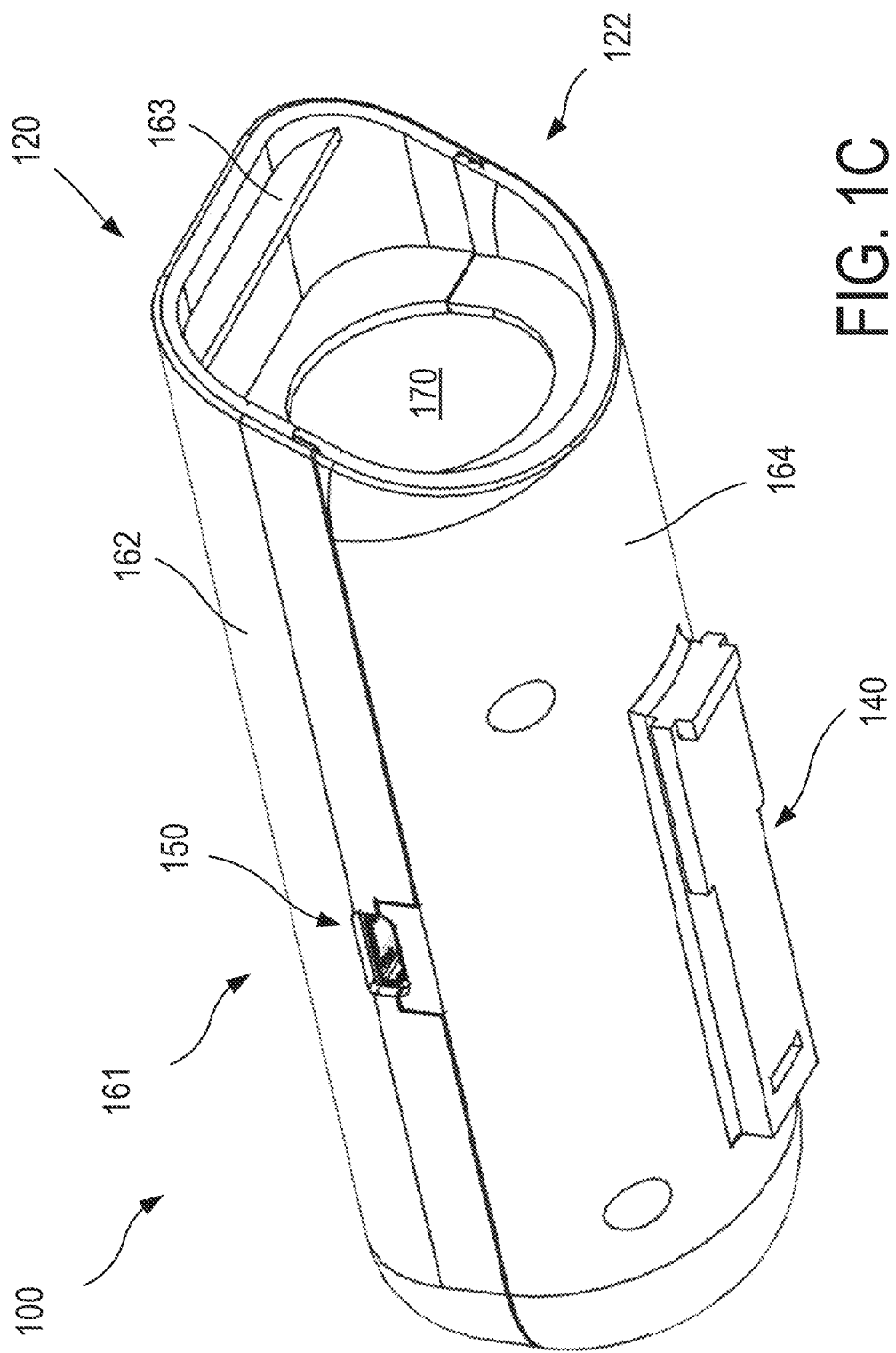

Turning now to the drawings, FIGS. 1A and 1B provide two different perspective views of a bicycle light system 100 according to embodiments of the present invention. As shown here, bicycle light system 100 includes a forward facing section 110, a rearward facing section 120, a power button 130, a light mount mechanism 140, and a battery charging port 150. Bicycle light system 100 also includes a rearward lens 170 and a forward lens 180. In some cases, a forward facing illumination mechanism, such as an LED, may be positioned within the housing of the bicycle light system and flush with the forward lens, so as to provide increased lighting of the road ahead of the bicycle rider. As shown in FIG. 1C, a rearward facing section 120 of the bicycle light system 100 includes a light blocking shield 163, which may also be referred to as an eye saver ridge. The light blocking shield 163 can operate to control the amount of light is projected onto the body or torso of a bicycle rider. A bicycle light system 100 can include a housing unit 161, and the housing unit can include upper housing 162 coupled with a lower housing 164.

In some embodiments, the rearward facing section 120 provides an eye shield hood 122 having a shape that is rectangular, curved, or rectangular and curved. In some cases, the eye shield hood is 16.15 mm long and 38 mm wide. In some cases, the eye shield hood extends 16.5 mm out in the posterior or rearward direction from a rearward facing illumination mechanism (e.g. LED) at an angle of about 15 degrees. In some cases, a bicycle light system provides a maximum potential of 3,575 $mm^2$ of surface area on a person (e.g. average height 5 feet, 9 inches) that can be illuminated from 558.8 mm away. If the person has more available surface area, the bicycle light system will still provide the same illumination area.

Figure 2:
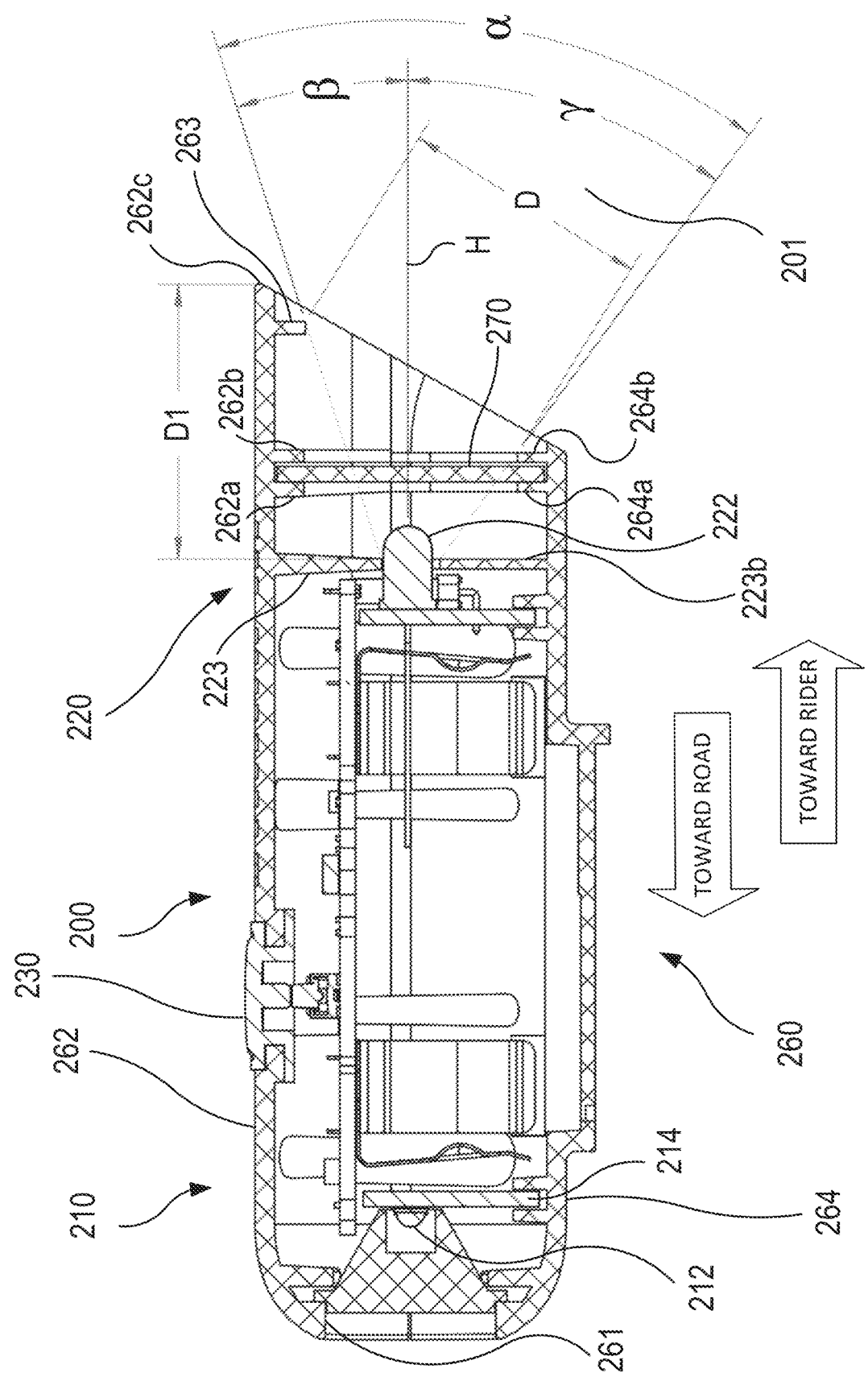
FIG. 2 illustrates aspects of exemplary bicycle light systems and methods, according to embodiments of the present invention.

FIG. 2 provides a cross-section view of a bicycle light system 200, according to embodiments of the present invention. As shown here, a forward facing section 210 of the system includes a forward facing illumination mechanism 212 and the rearward facing section 220 of the system includes a rearward facing illumination mechanism 222. A housing assembly 260 of the bicycle light system 200 can include an upper housing 262 and a lower housing 264. As shown here, housing assembly 260 defines a road light aperture 261, through which light emitted from the forward facing illumination mechanism 212 can pass. In the embodiment depicted here, the forward facing illumination mechanism 212 is coupled with a road lens mount 214, which in turn is coupled with the lower housing 264. According to some embodiments, the upper housing 262 includes an anterior rider light cover slot 262a and a posterior rider light cover slot 262b, and the lower housing 264 includes an anterior rider light cover slot 264a and a posterior rider light cover slot 264b. A rearward lens 270 can be disposed between the anterior rider light cover slot 262a and the posterior rider light cover slot 262b of the upper housing 262 and between the anterior rider light cover slot 264a and the posterior rider light cover slot 264b of the lower housing 264. The upper housing 262 can also include a light blocking shield 263, which may also be referred to as an eye saver ridge. As explained elsewhere herein, a light blocking shield 263 can operate to control the amount of light is projected onto the body or torso of a bicycle rider. The bicycle light system 200 can also have a power button 230. The housing assembly 260 of the bicycle light system 200 can include a rear frame 223 that is configured to receive the rearward facing illumination mechanism 222. As shown here, the housing assembly 260 can define a distance D1 between the posterior surface 223b of the rear frame 223 and a posterior edge 262c of the upper housing 262. In some cases, distance D1 has a value of about 1.1 inches. In some cases, distance D1 can have a value within a range from about 12 inches to about 24 inches. In some cases, distance D1 can correspond to a length of the eye shield hood of a bicycle light system. In some cases, the length of an eye shield hood can be a distance between a posterior end of the rearward facing illumination mechanism 222 and the posterior edge 262c of the upper housing 262. In some cases, the distance D1 can be selected so as to provide a large illuminated surface on the rider of the bicycle, while also preventing the rearward facing illumination from shining in the rider's eyes.

As shown in FIG. 2, light 201 from the rearward facing illumination mechanism 222 that is projected in the rearward direction toward the bicycle rider has a superior-inferior projection angle α. In some cases, projection angle α has a value of about 54°. In some cases, projection angle α can have a value within a range from about 34° to about 74°. In some cases, the light that is projected in the rearward direction has an upper angle β superior to a horizontal plane H. In some cases, the upper angle β has a value of about 18°. In some cases, the upper angle β can have a value within a range from about 0° (or 1°) to about 36°. In some cases, the light that is projected in the rearward direction has a lower angle γ inferior to a horizontal plane H. In some cases, the lower angle γ has a value of about 36°. In some cases, the lower angle γ can have a value within a range from about 18° to about 54°. As depicted in FIG. 2, the housing assembly 260 can define a distance D between the light blocking shield 263 and the anterior rider light cover slot 264a. In some cases, distance D can have a value of about 1 inch. In some cases, distance D can have a value within a range from about 0.25 inches to about 3 inches. In some cases, horizontal plane H is parallel to the ground when the bicycle light system 200 is mounted to a bicycle. In some case, horizontal plane H is not parallel to the ground when the bicycle light system 200 is mounted to a bicycle.

Embodiments of the present invention encompass systems and methods for shining light on the rider and the road. Exemplary light system and method embodiments enable vehicles traveling on or near the road to notice a bicycle rider sooner, and/or from farther away, as compared with other existing light systems and methods. In some cases, a bicycle light system provides a spotlight over the front wheel of the bicycle, and a rainbow light that illuminates the cyclist without reducing the rider's ability to see.

Figure 3A:
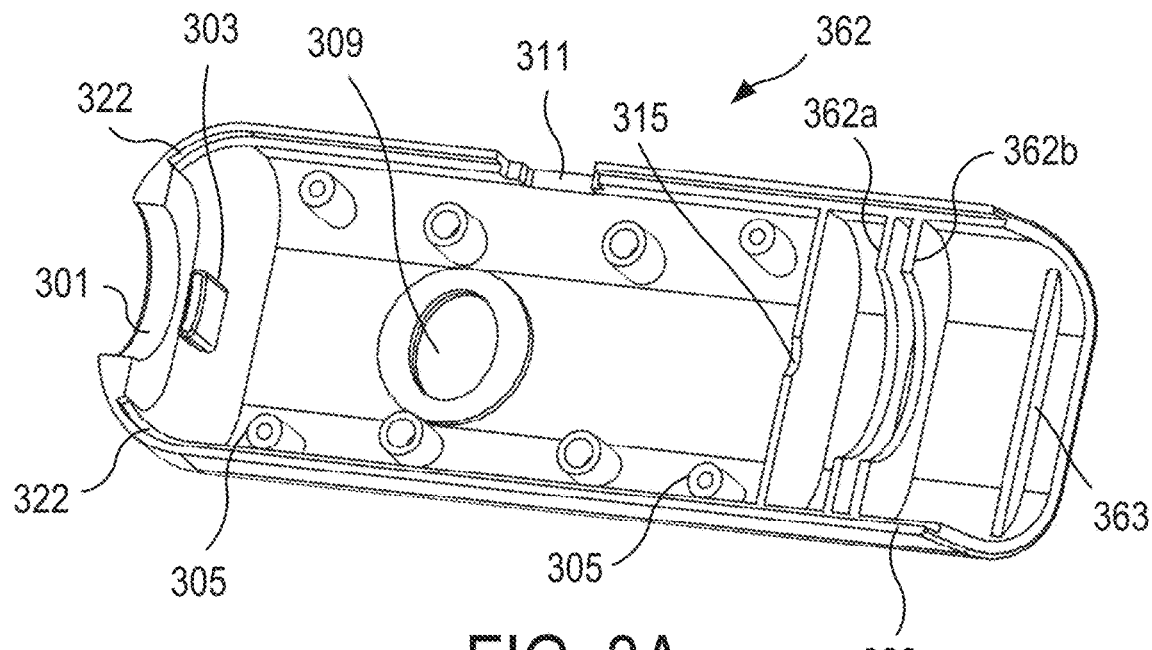
FIGS. 3A and 3B depict aspects of exemplary bicycle light systems and methods, according to embodiments of the present invention.

FIG. 3A provides a perspective view of an upper housing 362 of a bicycle light system, according to embodiments of the present invention. In some cases, upper housing 362 is part of a housing unit. As shown here, upper housing 362 includes a front cutout 301, that when combined with a front cutout of a lower housing, forms a front aperture or a road light aperture, through which light emitted from a forward facing illumination mechanism can pass. Upper housing 362 also includes an upper road lens mount 303, which in concert with a lower road lens mount, can operate to secure or hold a road lens or forward lens. As shown here, upper housing 362 can further include upper fixation bosses or mounts 305, such as screw bosses or screw mounts, which in combination with lower fixation bosses or mounts, can operate to help secure the upper housing 362 with a lower housing. In some cases, upper screw bosses or mounts can be secured with lower screw bosses or mounts using screws (not shown). Adhesives or other fixation mechanisms or materials can be used to secure upper and lower fixation bosses or mounts together. Upper housing 362 can include an upper aperture or button hole 309, which can operate to receive or provide access to a power button. Upper housing 362 also includes an upper charging port cutout 311, that when combined with a lower charging port cutout of a lower housing, forms a charging port or charging port slot, which can operate to receive or provide access to a charging port connector. Upper housing 362 includes an upper rider light slot 315 (e.g. in a rear frame), that when combined with a lower rider light slot of a lower housing, forms a rider light aperture through which a rider light or rearward facing illumination mechanism can pass. Upper housing 362 includes an anterior rider light cover slot 362a and a posterior rider light cover slot 362b.

The upper housing 362 can also include a light blocking shield 363, which may also be referred to as an eye saver ridge. In some embodiments, upper housing 362 may include a lipping groove or ridge 322 that is configured to engage with a corresponding lipping groove or ridge of a lower housing, and the lipping grooves/ridges of the upper and lower housing elements can operate to help hold the upper and lower housing elements together.

Figure 3B:
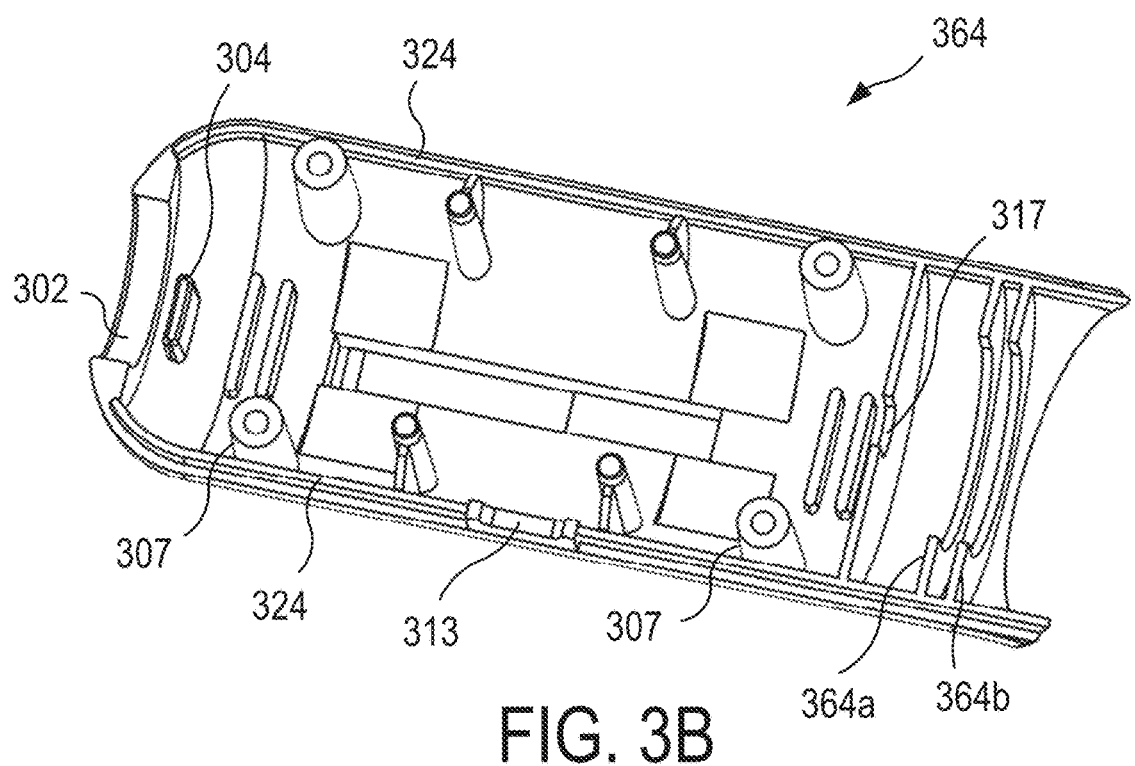

FIG. 3B provides a perspective view of a lower housing 364 of a bicycle light system, according to embodiments of the present invention. In some cases, lower housing 364 is part of a housing unit. As shown here, lower housing 364 includes a front cutout 302, that when combined with a front cutout of an upper housing, forms a front aperture or a road light aperture, through which light emitted from a forward facing illumination mechanism can pass. Lower housing 364 also includes a lower road lens mount 304, which in concert with an upper road lens mount, can operate to secure or hold a road lens or forward lens. As shown here, lower housing 364 can further include lower fixation bosses or mounts 307, such as screw bosses or screw mounts, which in combination with upper fixation bosses or mounts, can operate to help secure the lower housing 364 with an upper housing. Lower housing 364 also includes a lower charging port cutout 313, that when combined with an upper charging port cutout of an upper housing, forms a charging port or charging port slot, which can operate to receive or provide access to a charging port connector. Lower housing 364 includes a lower rider light slot 317 (e.g. in a rear frame), that when combined with an upper rider light slot of an upper housing, forms a rider light aperture through which a rider light or rearward facing illumination mechanism can pass. Lower housing 364 includes an anterior rider light cover slot 364a and a posterior rider light cover slot 364b. In some embodiments, lower housing 364 may include a lipping groove or ridge 324 that is configured to engage with a corresponding lipping groove or ridge of an upper housing, and the lipping grooves/ridges of the upper and lower housing elements can operate to help hold the upper and lower housing elements together.

Figure 4A:
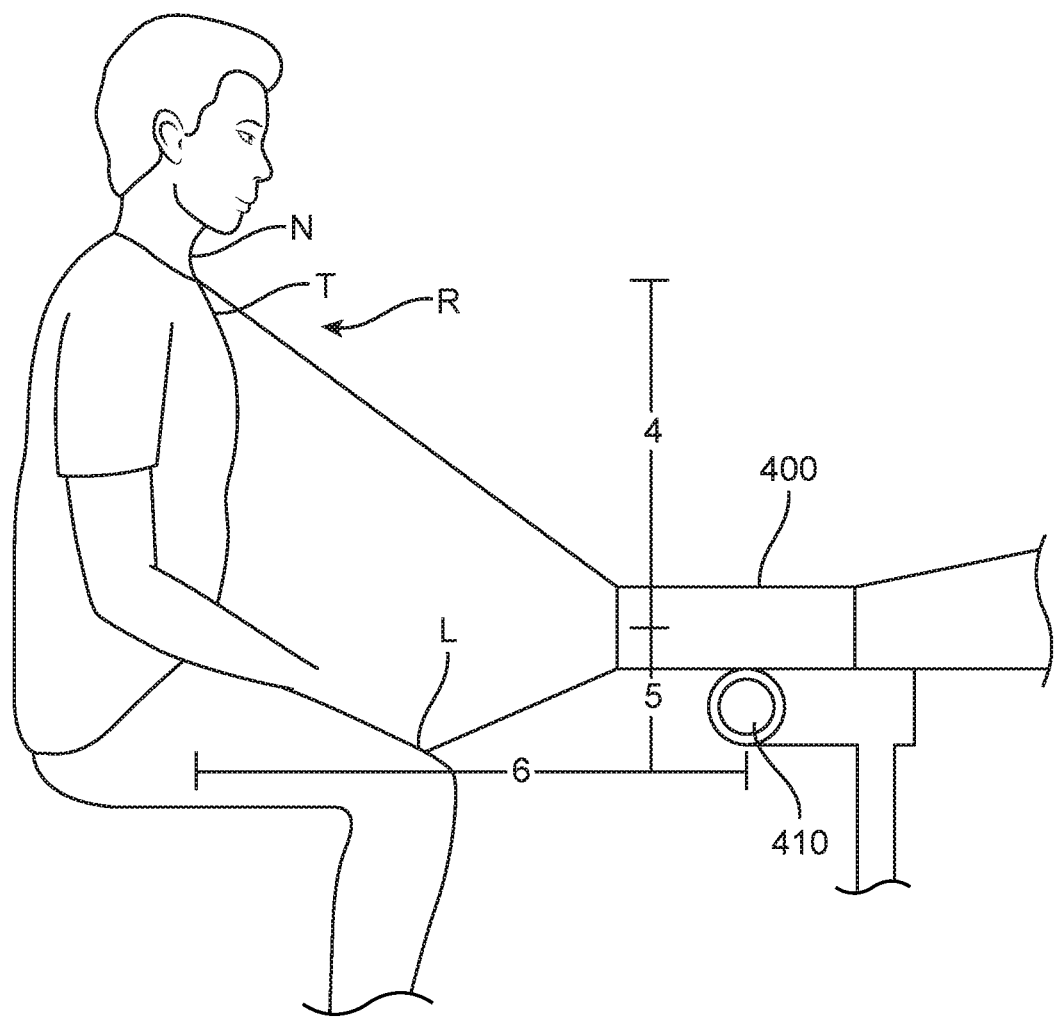
FIGS. 4A to 4G show aspects of exemplary bicycle light systems and methods, according to embodiments of the present invention.
Figure 4B:
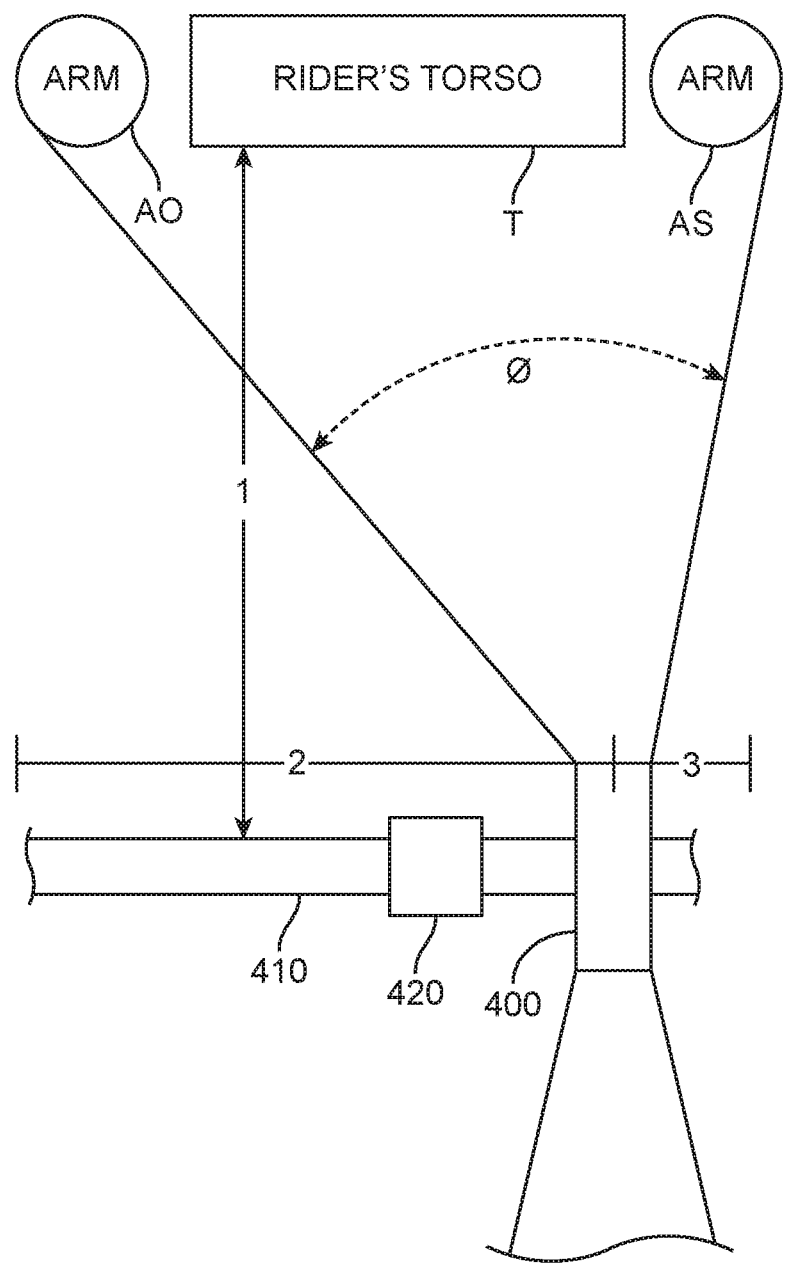

FIG. 4A depicts aspects of a bicycle light system according to embodiments of the present invention. In this view, the placement of the bicycle light system 400 is depicted from the side of the rider, as mounted on the handlebars 410 of the bicycle. As shown here, dimension 4 represents the vertical distance from the bicycle light system 400 to the neck N or neck level of the rider R. Dimension 5 represents the vertical distance from the bicycle light system to the middle of the leg L or leg level of the rider (e.g. when the rider's leg is in the upstroke pedal position). Dimension 6 represents the horizontal distance from the bicycle light system 400 to the front of the rider's torso T. FIG. 4B depicts aspects of a bicycle light system according to embodiments of the present invention. In this view, the placement of the bicycle light system 400 is depicted from the top of the rider, as mounted on the handlebars 410 of the bicycle. As shown here, the bicycle light system 400 can be located and/or mounted on the handlebars 410, at a distance 1 from the rider's body or torso T. In some cases, this distance 1 can be about 2 feet. Dimension 2 represents the horizontal or lateral distance from the bicycle light system 400 to the opposite-side arm AO of the rider (e.g. mounting side to opposite side arm). Dimension 3 represents the horizontal or lateral distance from the bicycle light system 400 to the same-side arm AS of the rider (e.g. mounting side to same side arm). As shown here, the bicycle light system 400 can be mounted on the handlebars 410 at an off-center location (e.g. laterally offset from the bicycle stem clamp 420). Light is projected toward the rider, across a lateral angle φ.

Figure 4C:
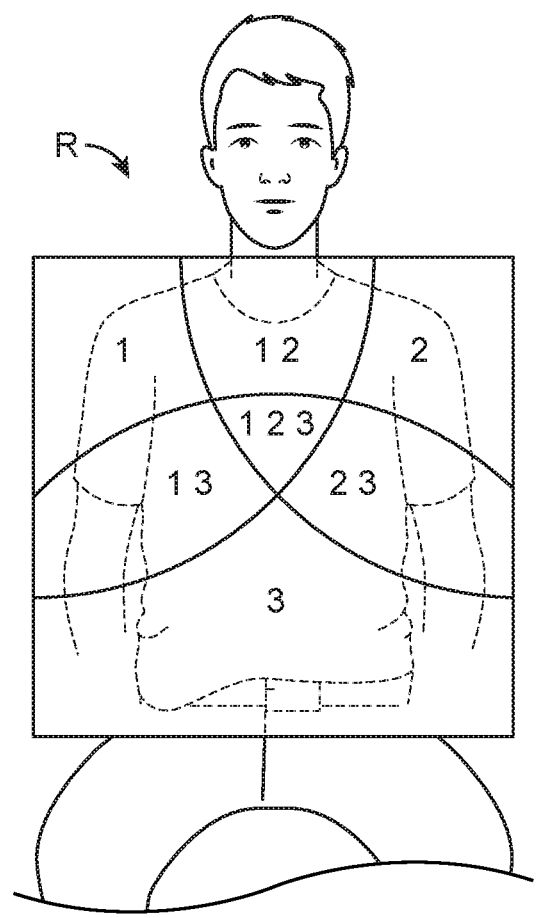

FIG. 4C depicts an exemplary lighting pattern according to embodiments, of the present invention. For example, a rearward facing light can include a tri-color LED light assembly, and the tri-color LED can produce light zones on the torso or rider R, as described in Table 1.

TABLE 1

| | |
|---|---|
| Zone 1 | Red |
| Zone 2 | Blue |
| Zone 3 | Green |
| Zone 1, 2 | Red/Blue (Magenta) |
| Zone 1, 3 | Red/Green (Yellow) |
| Zone 2, 3 | Blue/Green (Cyan) |
| Zone 1, 2, 3 | Red/Blue/Green (White) |

Hence, a tri-color light assembly can be configured with different color patterns to produce different color zones, including different light zone combinations in the overlapping area between light zones produced by the light patterns.

Advantageously, such multi-color and multi-zone light patterns can help the rider to retain excellent night vision, as compared with a bicycle light system which only projects white light against the rider's body. Such light patterns can also allow the rider to be seen when wearing any color of clothing, and can attract the attention of an automobile driver more effectively than a uniform white light, because it is much more noticeable (e.g. novel visual feature).

In one embodiment of the tri-color LED light assembly projects a first light pattern, a second light pattern, and a third light pattern to produce an illumination pattern on a front torso of a person riding the bicycle. With reference to FIG. 4C, an illumination pattern can have a first light zone 1 provided by a first light pattern, a second light zone 2 provided by a second light pattern, a third light zone 3 provided by a third light pattern, and a fourth light zone 123 created by the overlap between the first, second, and third light patterns.

In some embodiments, a tri-color LED light assembly can project a first light pattern, a second light pattern, and a third light pattern to produce an illumination pattern on a front torso of a person riding the bicycle. A first light zone 1 provided by the first light pattern is red, a second light zone 2 provided by the second light pattern is blue, a third light zone 3 provided by the third light pattern is green, and a fourth light zone 123 created by the overlap between the first, second, and third light patterns is white.

In some embodiments, a tri-color LED light assembly can project a first light pattern, a second light pattern, and a third light pattern to produce an illumination pattern on a front torso of a person riding the bicycle. A first light zone 1 provided by the first light pattern is red, a second light zone 2 provided by the second light pattern is blue, a third light zone 3 provided by the third light pattern is green, a fourth light zone 123 created by the overlap between the first, second, and third light patterns is white, a fifth light zone 12 created by the overlap between the first and second light patterns is magenta, a sixth light zone 13 created by the overlap between the first and third light patterns is yellow, and a seventh light zone 23 created by the overlap between the second and third light patterns is cyan.

In some embodiments, a tri-color LED light assembly can project a first light pattern, a second light pattern, and a third light pattern to produce an illumination pattern on a front torso of a person riding the bicycle. A first light zone 1 provided by the first light pattern is red, a second light zone 2 provided by the second light pattern is blue, a third light zone 3 provided by the third light pattern is green, a fourth light zone 123 created by the overlap between the first, second, and third light patterns is white, a fifth light zone 12 created by the overlap between the first and second light patterns is magenta, and a sixth light zone 13 created by the overlap between the first and third light patterns is yellow.

In some embodiments, a tri-color LED light assembly can project a first light pattern, a second light pattern, and a third light pattern to produce an illumination pattern on a front torso of a person riding the bicycle. A first light zone 1 provided by the first light pattern is red, a second light zone 2 provided by the second light pattern is blue, a third light zone 3 provided by the third light pattern is green, a fourth light zone 123 created by the overlap between the first, second, and third light patterns is white, a fifth light zone 12 created by the overlap between the first and second light patterns is magenta, and a sixth light zone 23 created by the overlap between the second and third light patterns is cyan.

In some embodiments, a tri-color LED light assembly can project a first light pattern, a second light pattern, and a third light pattern to produce an illumination pattern on a front torso of a person riding the bicycle. A first light zone 1 provided by the first light pattern is red, a second light zone 2 provided by the second light pattern is blue, a third light zone 3 provided by the third light pattern is green, a fourth light zone 123 created by the overlap between the first, second, and third light patterns is white, a fifth light zone 13 created by the overlap between the first and third light patterns is yellow, and a sixth light zone 23 created by the overlap between the second and third light patterns is cyan.

Figure 4D:
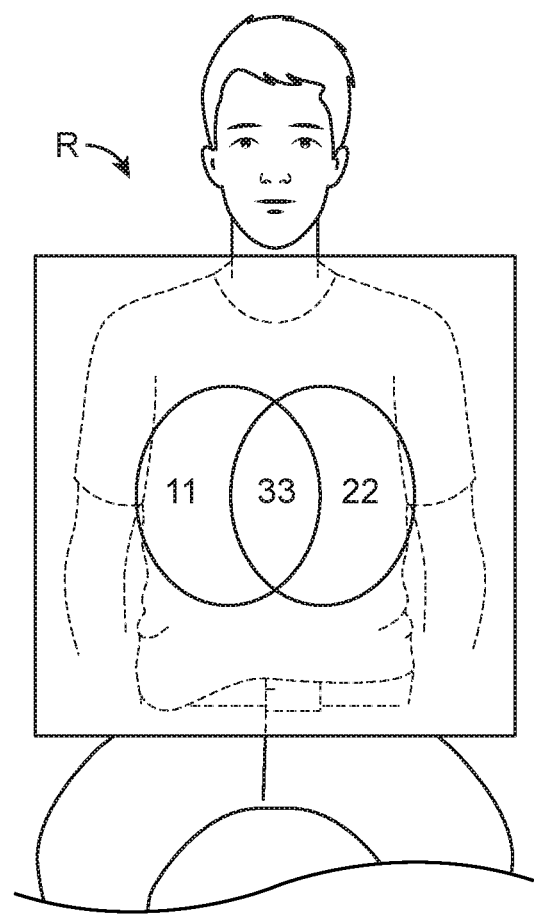

FIG. 4D depicts an exemplary lighting pattern according to embodiment, of the present invention. For example, a rearward facing light can include a bi-color LED light assembly, and the bi-color LED can produce light zones on the torso of a rider R. The bi-color light assembly can be configured with different color patterns to produce different color zones, including different light zone combinations in the overlapping area between light zones produced by the light patterns.

In some embodiments, a bi-color LED light assembly can project a first light pattern and a second light pattern to produce an illumination pattern on a front torso of a person riding the bicycle. The illumination pattern has a first light zone 11 provided by the first light pattern, a second light zone 22 provided by the second light pattern, and a third light zone 33 created by the overlap between the first and second light patterns.

In some embodiments, a bi-color LED light assembly can project a red light pattern and a blue light pattern to produce an illumination pattern on a front torso of a person riding the bicycle. The first light zone 11 provided by the red light pattern is red, the second light zone 22 provided by the blue light pattern is blue, and the third light zone 33 created by the overlap between the red and blue light patterns is magenta.

In some embodiments, a bi-color LED light assembly can project a red light pattern and a green light pattern to produce an illumination pattern on a front torso of a person riding the bicycle. The first light zone 11 provided by the red light pattern is red, the second light zone 22 provided by the green light pattern is green, and the third light zone 33 created by the overlap between the red and green light patterns is yellow.

In some embodiments, a bi-color LED light assembly can project a blue light pattern and a green light pattern to produce an illumination pattern on a front torso of a person riding the bicycle. A first light zone 11 provided by the blue light pattern is blue, a second light zone 22 provided by the green light pattern is green, and a third light zone 33 created by the overlap between the blue and green light patterns is cyan.

According to some embodiments, the color of an object (e.g. a shirt of a bicycle rider) can be dependent on two things, namely the color of light shining on the object, and the color of light which the object absorbs. As described herein, different colors can be combined in various ways to produce additional colors. For example, three primary colors (e.g. red, green, and blue) can be combined in various ways to produce four additional colors (e.g. white, magenta, yellow, cyan). White can be produced by combining red, blue and green. Magenta can be produced by combining red and blue. Yellow can be produced by combining red and green. Cyan can be produced by combining blue and green. Hence, white light is a combination of red, blue, and green light.

When white light shines on an object (e.g. the jacket of a bicycle rider) and the object does not absorb any (visible) light, then the object will appear white. However, when the object absorbs blue light then part of the white light (meaning the blue portion) will be absorbed leaving the red and green portions of the light to be reflected, which combine to produce reflected yellow light. This phenomenon is known as "light subtraction" because some light reaching an object is being absorbed (or subtracted) rather than reflected away from the object. Hence, an object (or a section of the object) that absorbs blue light will appear to be yellow, due to the combined effect of the reflected red and green light.

Accordingly, in some embodiments, the color of the shirt or jacket which a rider is wearing while using a bicycle light system as described herein may impact what colors appear on (or to be reflected from) the rider's torso. Table 1A provides an example of this phenomenon.

TABLE 1A

| Zone | No light absorption E.g. a white shirt (same as Table 1) | Blue light absorption (example, a yellow shirt) |
|---|---|---|
| 1 | Red | Red |
| 2 | Blue | Black (B − B = No light/black) |
| 3 | Green | Green |
| 1, 2 | Magenta (R + B) | Red (M − B = (R + B) − B = R) |
| 1, 3 | Yellow (R + G) | Yellow (Y − B = (R + G) B = R + G) |
| 2, 3 | Cyan (B + G) | Green (C − B = (B + G) − B = G) |
| 1, 2, 3 | White (R + B + G) | Yellow (W − B = (R + B + G) − B = R + G) |

Figure 4E:
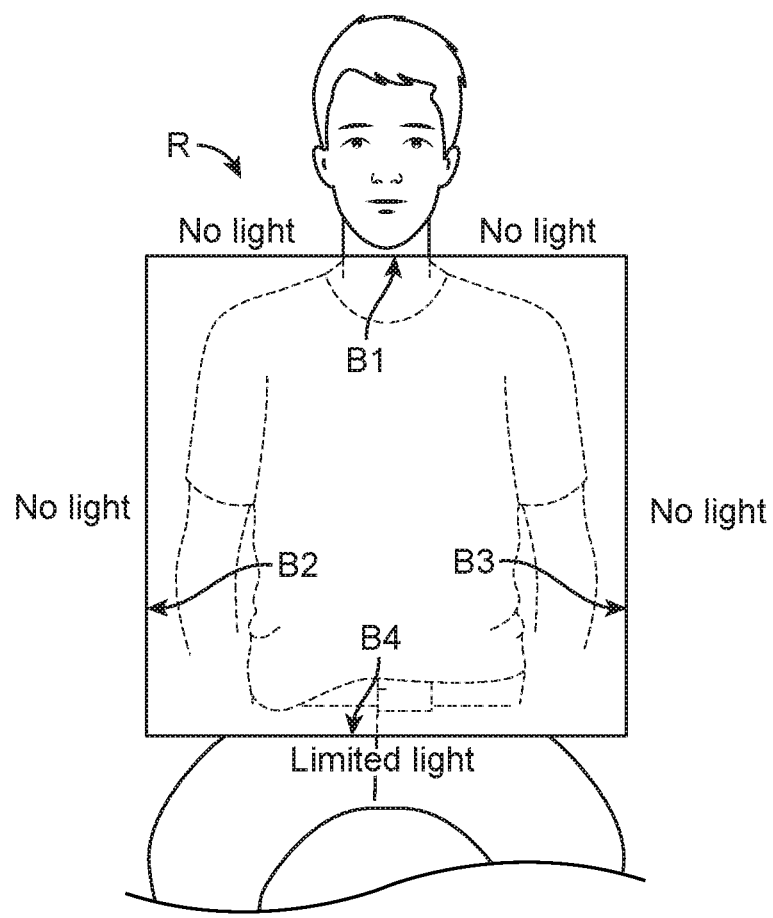
Figure 4F:
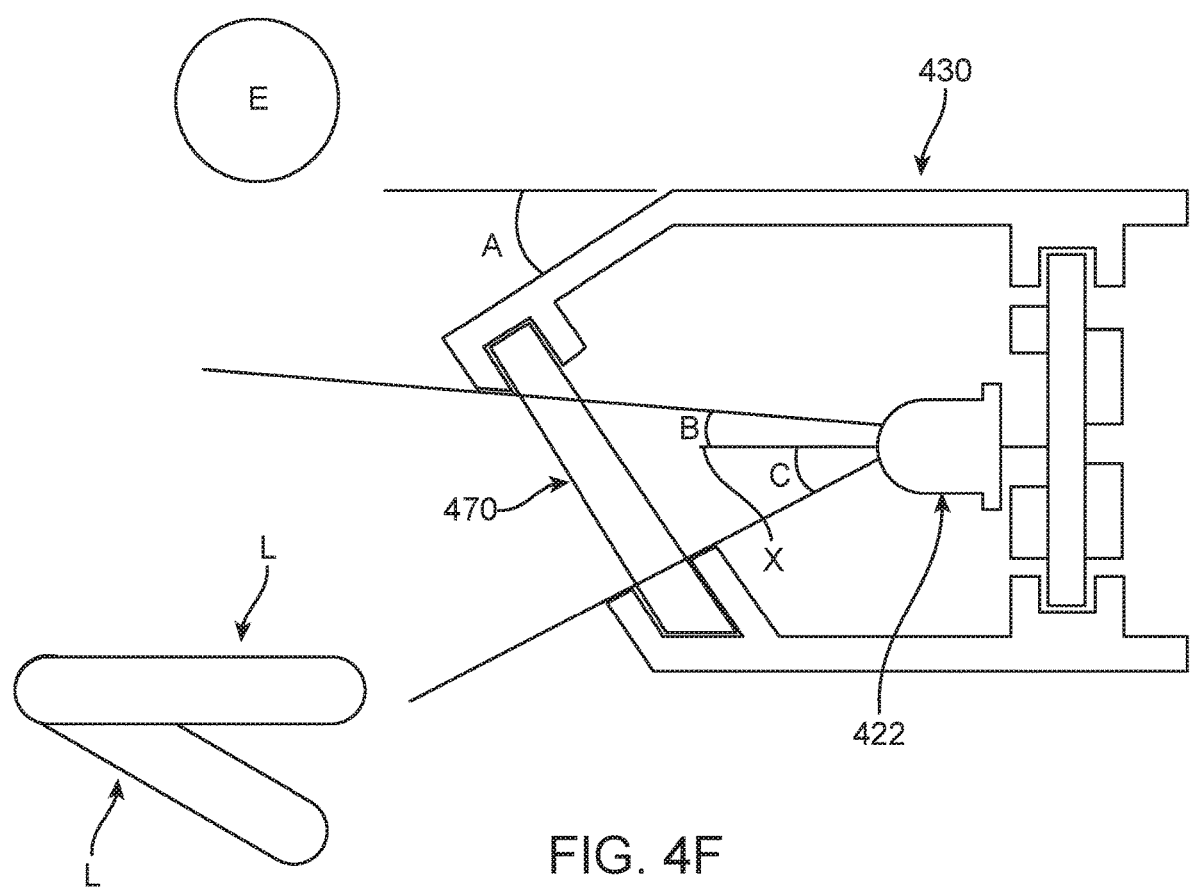
Figure 4G:
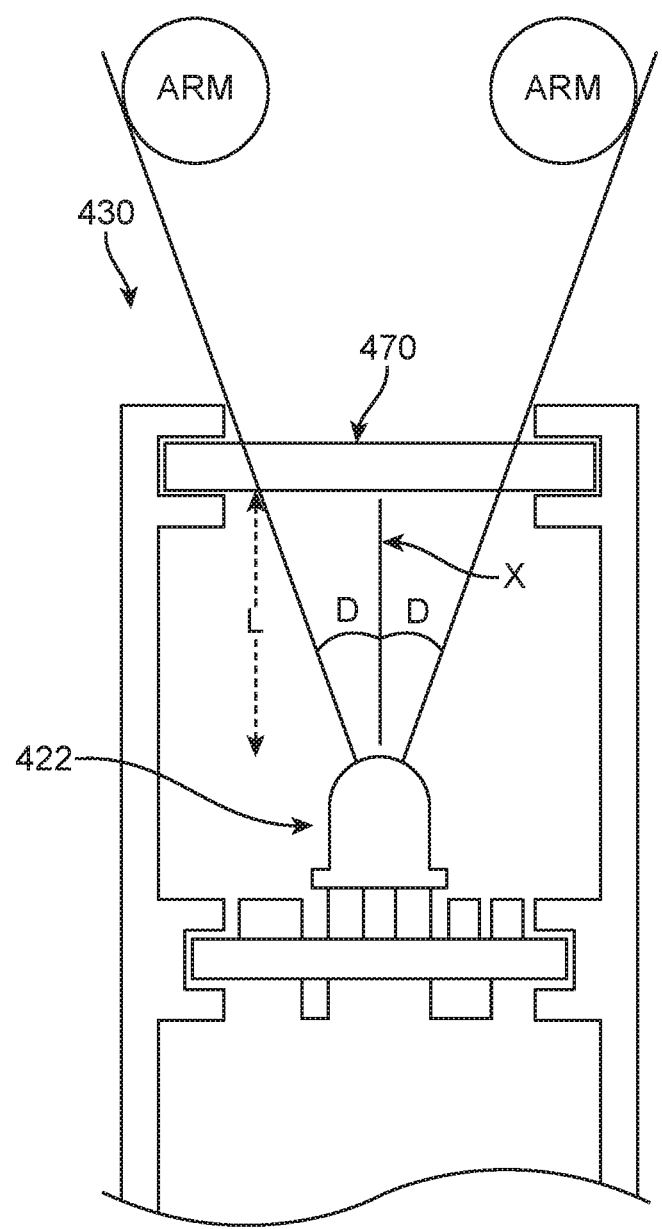
Figure 5A:
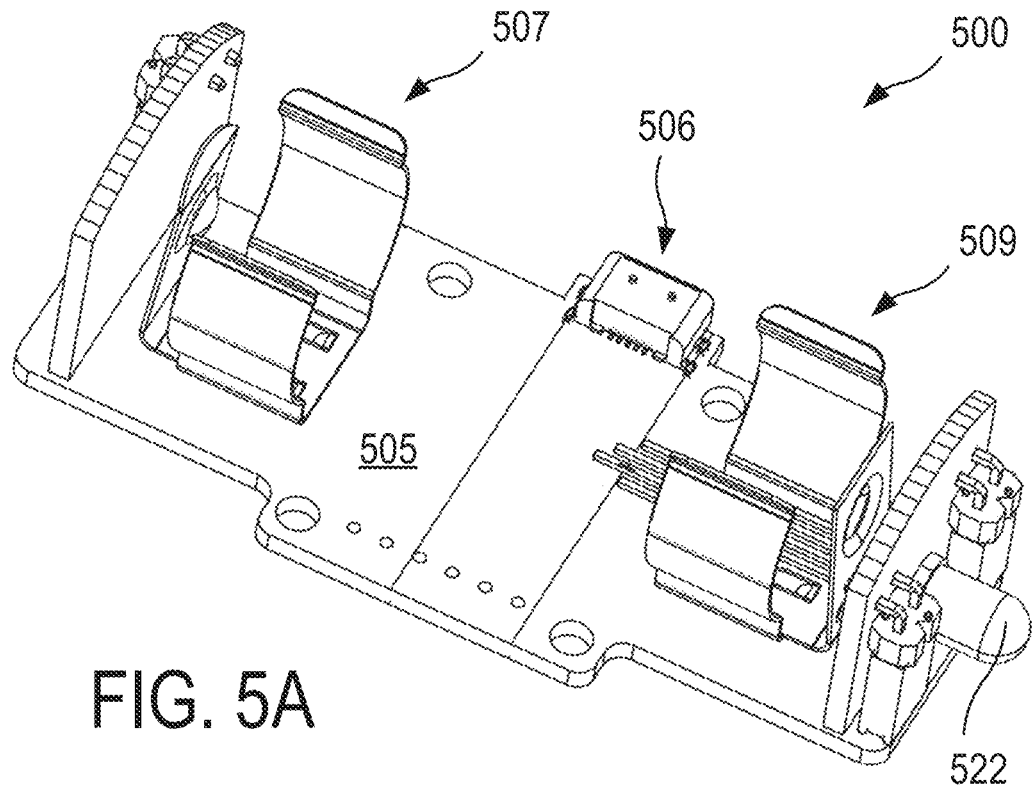
FIGS. 5A to 5F depict aspects of exemplary bicycle light systems and methods, according to embodiments of the present invention.
Figure 5B:
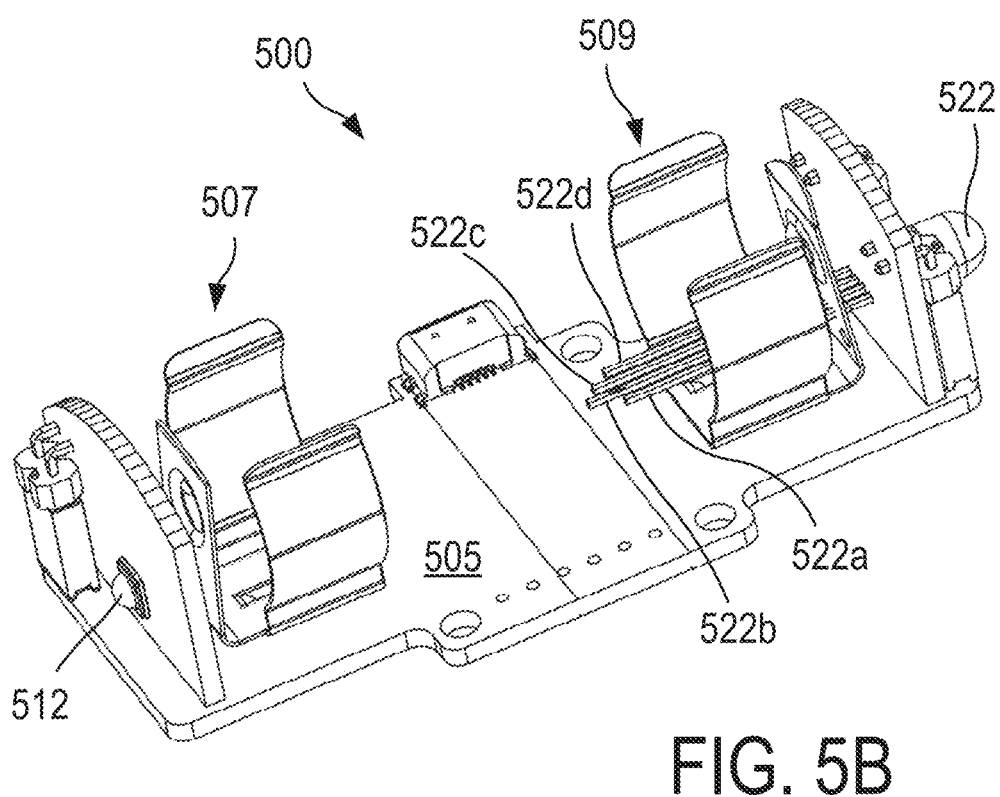
Figure 5C:
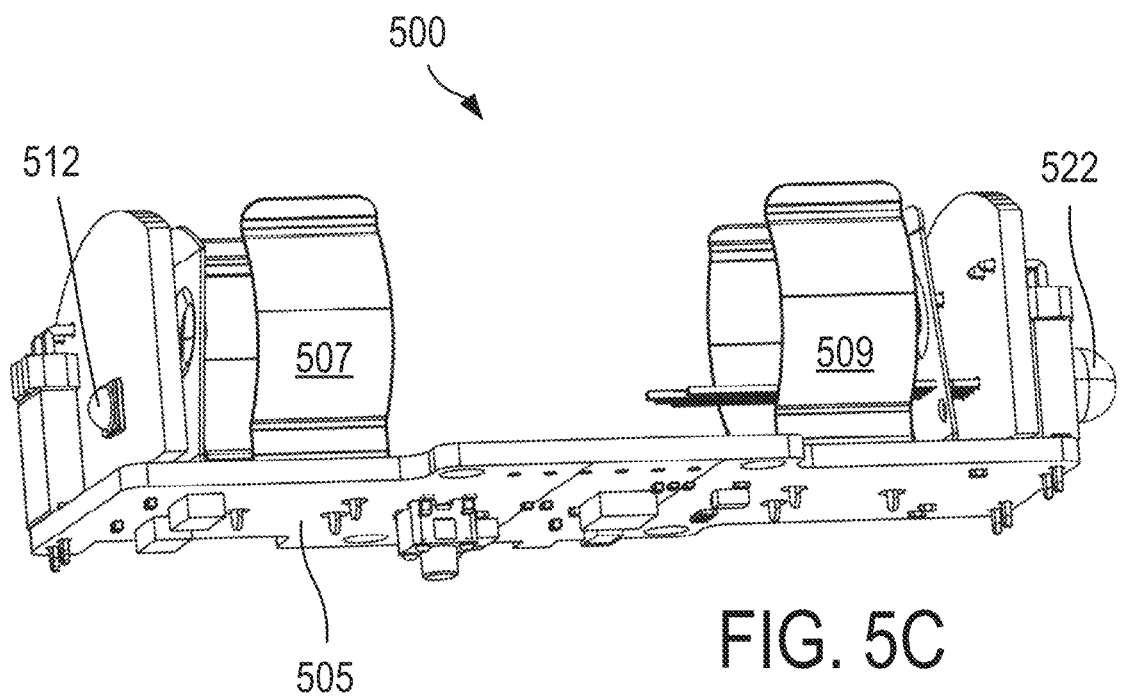
Figure 5D:
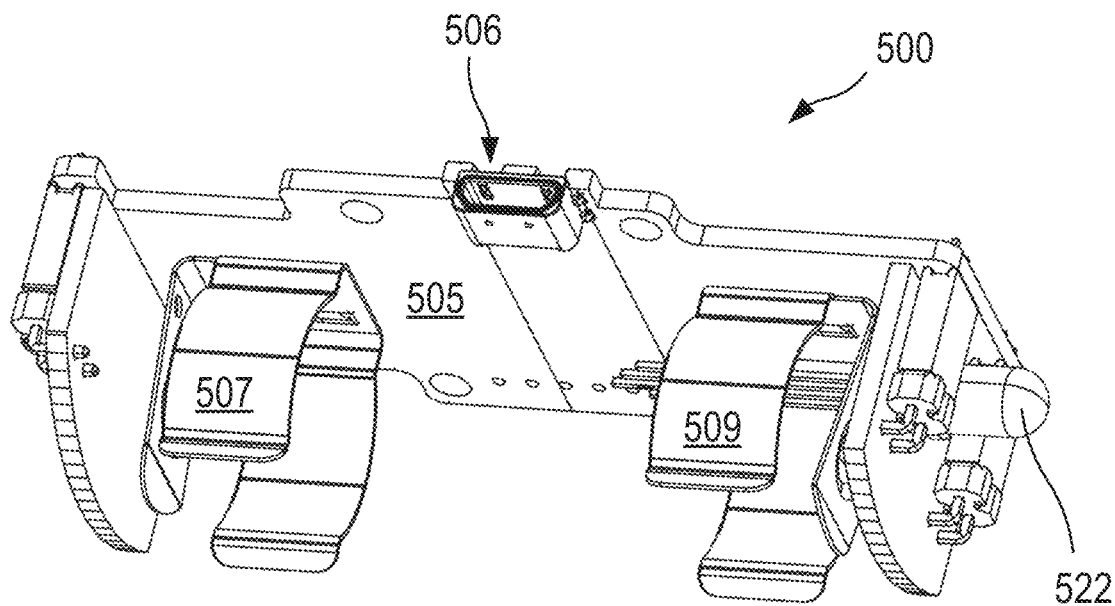
Figure 5E:
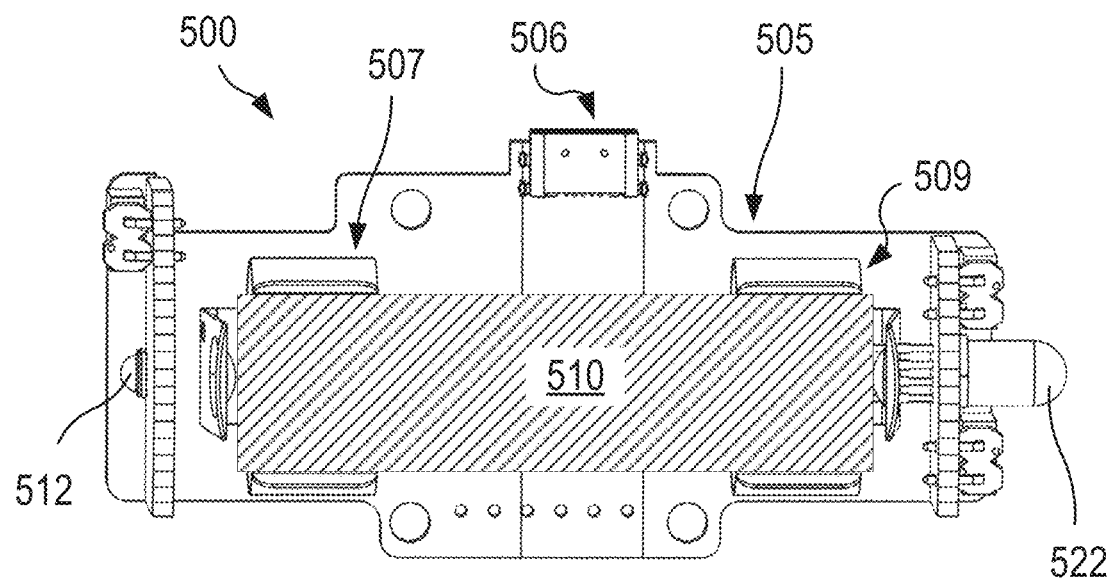
Figure 5F:
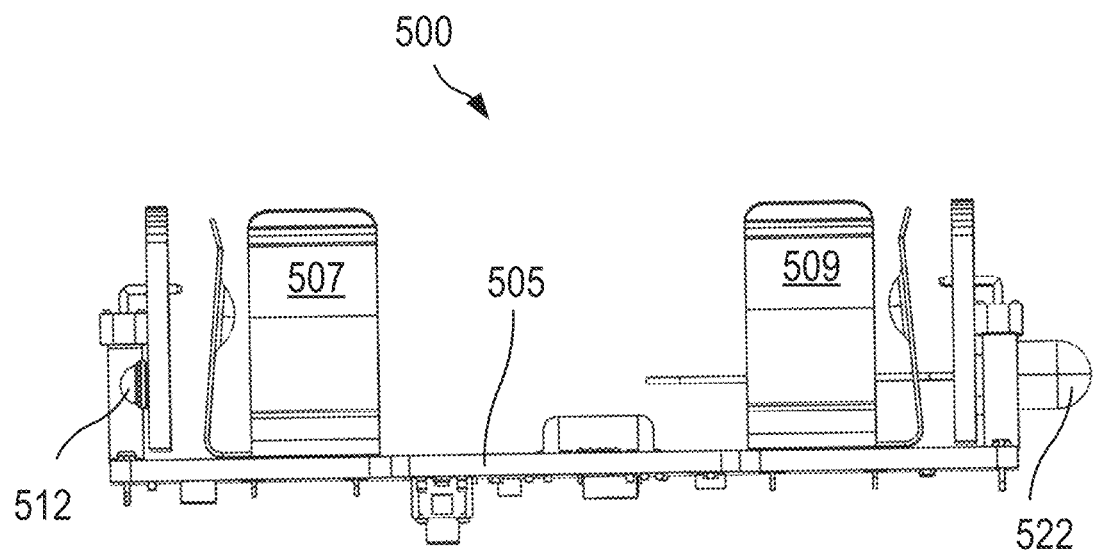

FIG. 4E depicts light pattern boundaries or restrictions according to embodiments of the present invention. As shown here, the light can be projected on the rider R subject to a zone boundary, such that no light is projected above an upper boundary B1, no light is projected to the right of a (rider's) right side boundary B2, no light is projected to the left of a (rider's) left side boundary B3, and little or no light is projected below a lower boundary B4. FIG. 4F depicts various dimensions of a housing unit or hood 430. As shown in the side view here, angle A and/or angle B can be selected so that light from a rearward facing illumination mechanism 422, which passes through a rearward lens 470, does not project rearward toward the rider's eyes E. Angle C can be selected so that light shines toward the rider's legs L. Axis X can represent a central longitudinal axis of the illumination mechanism 422. FIG. 4G depicts various dimensions of a housing unit or hood 430. As shown in the top view here, angle D can be selected so that light from a rearward facing illumination mechanism 422, which passes through a rearward lens 470, illuminates the rider's arms and is not excessively wide. Axis X can represent a central longitudinal axis of the illumination mechanism 422. In some cases, the support upon which the illumination mechanism 422 is mounted includes components on both the forward facing side and the rearward facing side. In some cases, the support upon which the illumination mechanism 422 is mounted includes components only on the rearward facing side, which can result in a less expensive and more efficient manufacturing process, and can also allow the light assembly to be tested more easily. What is more, such a configuration can make it easier to test the light assembly. Further, with such a configuration, the battery (or power source) and/or other related support mechanisms will not conflict or collide with other components. The posterior end 422a of the rearward facing illumination mechanism 422 can be positioned at a distance L from the rearward lens 470, so at to achieve desired illumination characteristics on the rider.

According to some embodiments, the distance from an RGB rider LED (e.g. 422) to a covering lens (e.g. 470) can be referred to as L, and the value of L can vary. In some cases, when the distance L is shorter, then size of the aperture for the covering lens (e.g. 470) will be smaller. In some cases, when the distance L is larger, then the aperture for the covering lens (e.g. 470) may be larger. For a compact design, it may be desirable to keep the distance L to a minimum. In some cases, so long as the angles α, β, and γ (see FIG. 2) are maintained, then the function is similarly maintained. In some cases, if the value of L is too small, then the illumination emanating from the aperture may not be sufficiently precise and the illumination may be a fuzzy line, and may not provide a clear distinction between illuminated and non-illuminated areas. In some embodiments, rearward lens 470 provides a shielding function (e.g. operates as a shield, providing protection to the interior elements of the bicycle light system such as the rearward facing illumination mechanism 422) but does not provide a lensing effect on the light that passes therethrough. In some cases, rearward lens 470 is constructed of an acrylic material.

FIGS. 5A to 5F depict aspects of a light assembly 500 according to embodiments of the present invention. In some cases, light assembly 500 can be a multicolor light assembly. As shown here, a light assembly 500 can include a support 505, and an anterior clip 507 and a posterior clip 509 for holding a power source 510 such as a battery (e.g. a rechargeable battery). Light assembly 500 may also include a forward facing illumination mechanism 512 and a rearward facing illumination mechanism 522. In some cases, a rearward facing illumination mechanism 522 may include a red anode 522a, a common cathode 522b, a blue anode 522c, and a green anode 522d. A light assembly 500 can also include a charging port connector 506. In some cases, a charging port connector can be a USB connector. In some cases, a charging port can be a micro USB connector. In some embodiments, the light assembly 500 operates to project a first light pattern and a second light pattern toward a torso of a person riding a bicycle. The first light pattern can have a first light color and the second light pattern can have a second light color. A bicycle light system can also have a housing unit that supports the multicolor light assembly.

In some cases, a light facing toward the rider's torso, such as a rearward facing illumination mechanism 522, can be or include an LED light. An exemplary LED light can be a 5 mm RGB LED common cathode (Kitronik, United Kingdom). In some cases, an LED can provide a uniform light output, with low power consumption, and can be I.C. compatible. In some cases, a red source color device can be made with AlGaInP on GaAs substrate. In some cases, a green source color device can be made with InGaN on GaAs substrate. In some cases, a blue source color device can be made with InGaAlN on GaAs substrate. In some cases, an LED light can have a maximum of 20 milliamps for each red, green and blue light component. In some cases, red, green, and blue light components can each be between 1 and 2 lumens, for a total of between 3 and 6 lumens. In some cases, the total is about 5 lumens. Such lights are much softer than even standard dim road lights which can be 50-100 lumens. Table 2 provides a description of aspects of an exemplary LED light, according to embodiments of the present invention.

TABLE 2

| Chip | | |
|---|---|---|
| Material | Emitted Color | Lens Color |
| AlGaInP | Red | Water clear |
| InGaN | Green | |
| InGaIN | Blue | |

Table 3 provides a description of aspects of an exemplary LED light, according to embodiments of the present invention. In some cases, the LED light described in Table 3 has the described absolute maximum ratings for Ta=25° C. (ambient temperature).

TABLE 3

| Parameter | Symbol | Absolute Maximum Rating | Unit |
|---|---|---|---|
| Forward Pulse Current | IFPM | 70 | mA |
| Forward Current | IFM | 30 | mA |
| Reverse Voltage | VR | 5 | V |
| Power Dissipation | PD | 140 | mW |
| Operating Temperature | Topr | −40~+80 | ° C. |
| Storage Temperature | Tstg | −40~+100 | ° C. |
| Soldering Temperature | Tsol | Reflow Soldering: 260° C. for 10 sec. Hand Soldering: 350° C. for 3 sec. | ° C. |

Table 4 provides a description of aspects of an exemplary LED light, according to embodiments of the present invention. In some cases, the LED light described in Table 4 has the described electro-optical characteristics for Ta=25° C. (ambient temperature).

TABLE 4

| Parameter | Symbol | Device | Min. | Typ. | Max. | Unit | Test Condition |
|---|---|---|---|---|---|---|---|
| Luminous Intensity | Iv | Red | 1000 | 1500 | 2300 | | |
| | | Green | 1200 | 2000 | 2700 | mcd | IF = 20 mA |
| | | Blue | 1000 | 1500 | 2200 | | |
| Viewing Angle | 2θ1/2 | Red | | | | | |
| | | Green | 40 | — | 50 | Deg | |
| | | Blue | | | | | |
| Peak Emission Wavelength | Δρ | Red | 635 | 640 | 650 | | |
| | | Green | 520 | 525 | 530 | nm | IF = 20 mA |
| | | Blue | 460 | 465 | 470 | | |
| Spectral Line Half-Width | λΔ | Red | 15 | 20 | 25 | | |
| | | Green | 15 | 20 | 25 | nm | IF = 20 mA |
| | | Blue | 25 | 30 | 35 | | |
| Forward | VF | Red | 1.9 | — | 2.5 | | |

TABLE 4-continued

| Parameter | Symbol | Device | Min. | Typ. | Max. | Unit | Test Condition |
|---|---|---|---|---|---|---|---|
| Voltage | | Green | 2.9 | — | 3.5 | V | IF = 20 mA |
| | | Blue | 2.9 | — | 3.5 | | |
| Reverse Current | IR | Red Green Blue | — | — | 10 | μA | VR = 5 V |

Figure 6:
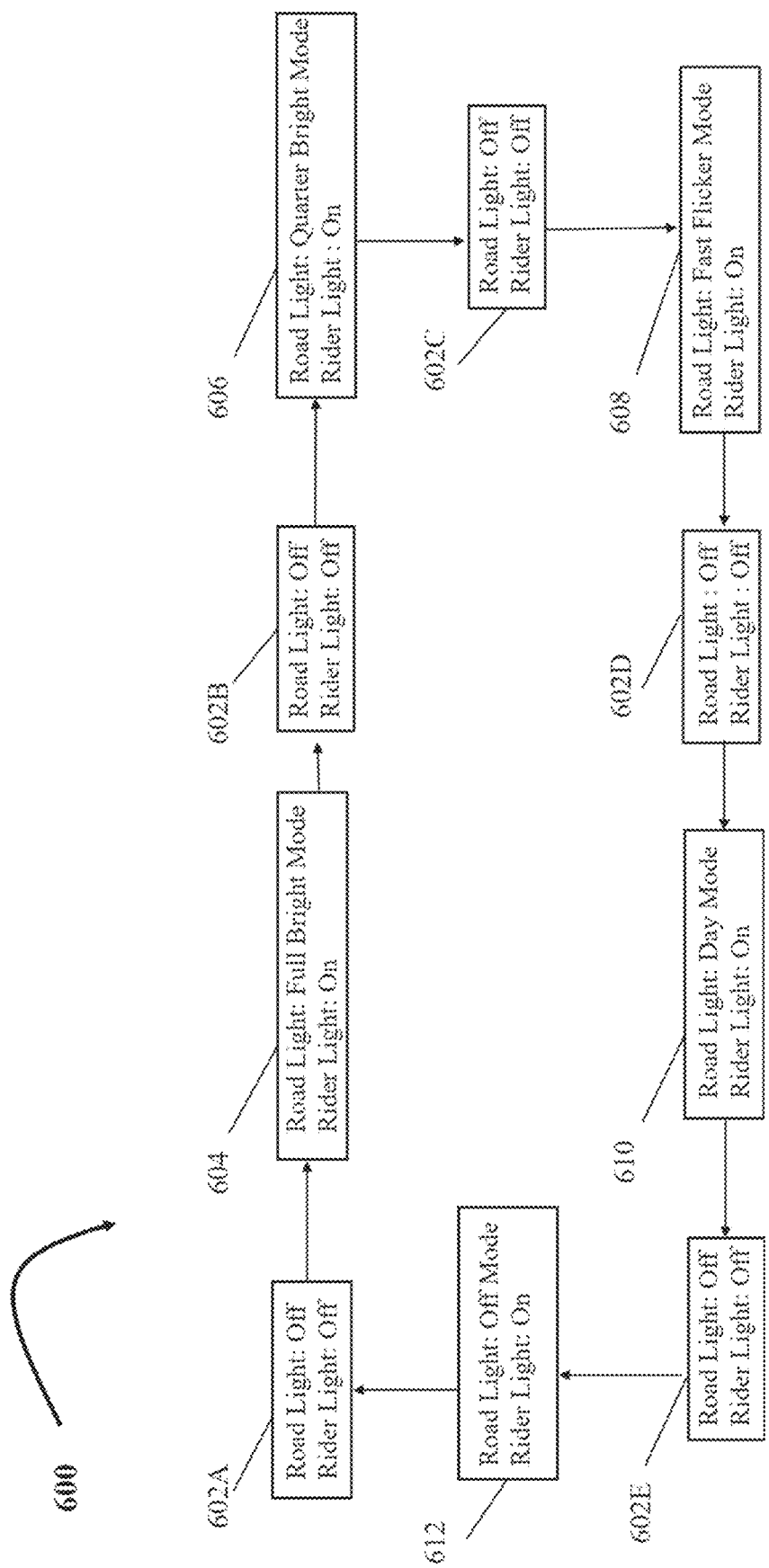
FIG. 6 illustrates aspects of exemplary bicycle light systems and methods, according to embodiments of the present invention.

While using the bicycle light system, a rider may encounter a variety of natural light conditions and may wish to adjust the illumination of the bicycle light system in accordance with the natural light conditions. FIG. 6 depicts an exemplary flow chart of an illumination scheme 600 for a programmed bicycle light system. As shown here, the illumination scheme 600 is configured to provide the bicycle light system with several different modes of operation. The bicycle light system can include a road light (e.g. forward facing illumination mechanism) and a rider light (e.g. rearward facing illumination mechanism). Where the bicycle light system is operating in a first mode, a power button of the bicycle light can be pressed or actuated to cause the bicycle light system to switch from the first mode to a second mode. These modes can affect the road light and rider light independently.

In one embodiment, pressing the power button subsequent times causes the bicycle light system to cycle through the modes. The modes are as follows: Full Bright Mode 604, Quarter Bright Mode 606, Fast Flicker Mode 608, Day Mode 610, and Road Light Off Mode 612, before cycling again through the modes. Between each mode both road light and rider light turn off fully 602A-E. When off, neither road light nor rider light provide any illumination.

As shown here, when the bicycle light system is in Full Bright Mode 604, the road light illuminates with a lumen intensity away from the rider to illuminate the road for the rider and provide visibility of the rider to others sharing the road with the rider, such as other bikers or cars. While in Full Bright Mode 604, the rider light projects light towards the rider at a fixed lumen intensity to illuminate the rider to provide visibility of the rider to others sharing the road, such as other bikers or cars, or to others near the road, such as pedestrians. In some cases, the front light provides an illumination intensity of about 500 lumens.

As shown here, when the bicycle light system is in Quarter Bright Mode 606, the road light illuminates with one quarter of the total lumen intensity away from the rider to illuminate the road for the rider and provide visibility of the rider to others sharing the road with the rider, such as other bikers or cars. While in Quarter Bright Mode 606, the rider light projects light towards the rider at a fixed lumen intensity to illuminate the rider to provide visibility of the rider to others sharing the road, such as other bikers or cars.

As shown here, when the bicycle light system is in Fast Flicker Mode 608, the road light alternates between periods of full lumen intensity and brief rapidly alternation between illuminating at a lumen intensity and not illuminating to create a 'strobe' effect away from the rider to illuminate the road for the rider and provide visibility of the rider to others sharing the road with the rider, such as other bikers or cars, while not being distracting to the rider. While in Fast Flicker Mode 608, the rider light projects light towards the rider at a fixed lumen intensity to illuminate the rider to provide visibility of the rider to others sharing the road, such as other bikers or cars.

As shown here, when the bicycle light system is in Day Mode 610 the road light illuminates at a minimal lumen intensity with short periods of alternating light between maximum lumen intensity and minimum lumen intensity away from the rider for a burst of flashed of light to conserve battery during day times and provide visibility of the rider to others sharing the road with the rider, such as other bikers or cars. The intensity is at its maximum for only a brief time in order to provide visibility when used during the daytime, in which natural light my reduce the visibility of the bike light system at a lower lumen intensity and conserve battery be not being on for the total duration of the mode. While in Day Mode, the rider light projects light towards the rider at a fixed lumen intensity to illuminate the rider to provide visibility of the rider to others sharing the road, such as other bikers or cars.

As shown here, when the bicycle light system is in Road Light Off Mode 612, the road light does not provide any illumination. While in Road Light Off Mode 612, the rider light projects light towards the rider at a fixed lumen intensity to illuminate the rider to provide visibility of the rider to others sharing the road, such as other bikers or cars.

Figure 7:
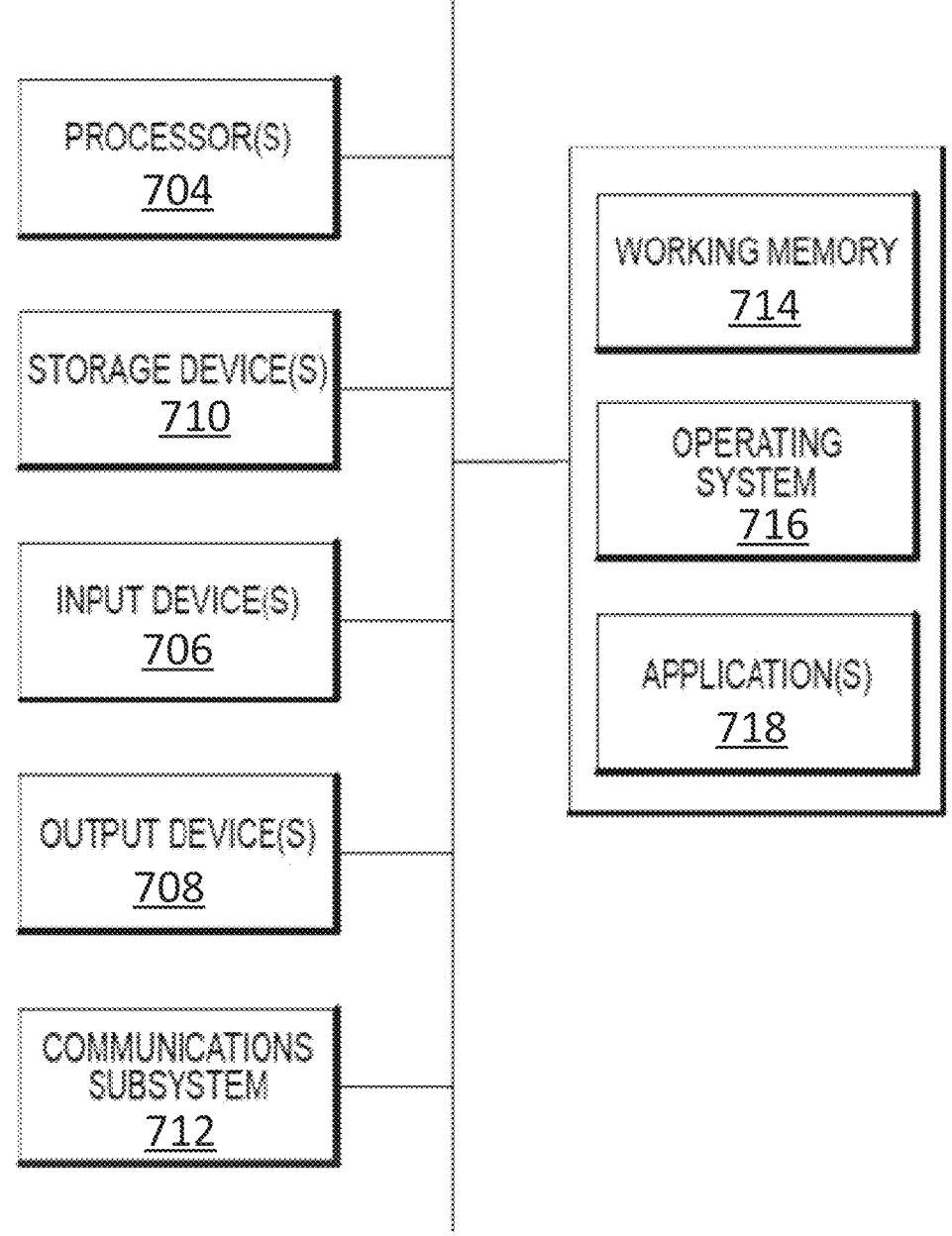
FIG. 7 illustrates aspects of exemplary bicycle light systems and methods, according to embodiments of the present invention.

FIG. 7 depicts an exemplary computer system or device 700 configured for use with a bicycle light system according to embodiments of the present invention. An example of a computer system or device 700 may include an enterprise server, blade server, desktop computer, laptop computer, tablet computer, personal data assistant, smartphone, any combination thereof, and/or any other type of machine configured for performing calculations. Any computing devices encompassed by embodiments of the present invention may be wholly or at least partially configured to exhibit features similar to the computer system 700.

The computer device 700 of FIG. 7 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, a button (e.g. a power and/or control button), and/or the like; and one or more output devices 708, which may include without limitation a presentation device (e.g., controller screen), a printer, one or more lights (e.g. LED), and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 can also include a communications subsystem 712, which may include without limitation a modem, a network card (wireless and/or wired), an infrared communication device, a wireless communication device and/or a chipset such as a Bluetooth device, 802.11 device, WiFi device, WiMax device, cellular communication facilities such as GSM (Global System for Mobile Communications), W-CDMA (Wideband Code Division Multiple Access), LTE (Long Term Evolution), and the like. The communications subsystem 712 may permit data to be exchanged with a network (such as the network described below, to name one example), other computer systems, controllers, and/or any other devices described herein. In many embodiments, the computer system 700 can further comprise a working memory 714, which may include a random access memory and/or a read-only memory device, as described above.

The computer device 700 also can comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code can be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, and the like), then takes the form of executable code.

It is apparent that substantial variations may be made in accordance with specific requirements. For example, customized hardware might also be used, and/or particular elements might be implemented in hardware, software (including portable software, such as applets, and the like), or both. Further, connection to other computing devices such as network input/output devices may be employed.

As mentioned above, in one aspect, some embodiments may employ a computer system (such as the computer device 700) to perform methods in accordance with various embodiments of the disclosure. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, can refer to any non-transitory medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Exemplary forms of physical and/or tangible computer-readable media may include a floppy disk, a flexible disk, hard disk, magnetic tape, or any other magnetic medium, a compact disc, any other optical medium, ROM, RAM, and the like, any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally can receive signals, and the bus 702 then can carry the signals (and/or the data, instructions, and the like, carried by the signals) to the working memory 714, from which the processor(s) 704 retrieves and executes the instructions. The instructions received by the working memory 714 may optionally be stored on a non-transitory storage device 710 either before or after execution by the processor(s) 704.

It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

A processor may be a hardware processor such as a central processing unit (CPU), a graphic processing unit (GPU), or a general-purpose processing unit. A processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 512 bit, 256 bit, 128 bit, 64 bit, 32 bit, or 16 bit data operations.

Each of the calculations or operations discussed herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described herein. All features of the described systems are applicable to the described methods mutatis mutandis, and vice versa. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. While the exemplary embodiments have been described in some detail, by way of example and for clarity of understanding, those of skill in the art will recognize that a variety of modification, adaptations, and changes may be employed.

All publications, patents, patent applications, journal articles, books, technical references, and the like mentioned in this specification are herein incorporated by reference to the same extent as if each individual publication, patent, patent application, journal article, book, technical reference, or the like was specifically and individually indicated to be incorporated by reference.

Where a range of values is provided, it is understood that each intervening value, to the tenth of the unit of the lower limit (unless the context clearly dictates otherwise), between the upper and lower limits of that range is also specifically disclosed. Each smaller range between any stated value or intervening value in a stated range and any other stated or intervening value in that stated range is encompassed by the instant disclosure. The upper and lower limits of these smaller ranges may independently be included or excluded in the range, and each range where either, neither or both limits are included in the smaller ranges is also encompassed within the instant disclosure, subject to any specifically excluded limit in the stated range. Where the stated range includes one or both of the limits, ranges excluding either or both of those included limits are also included in the instant disclosure.

While the above provides a full and complete disclosure of exemplary embodiments of the present invention, various modifications, alternate constructions and equivalents may be employed as desired. Consequently, although the embodiments have been described in some detail, by way of example and for clarity of understanding, a variety of modifications, changes, and adaptations will be obvious to those of skill in the art. Accordingly, the above description and illustrations should not be construed as limiting the invention, which can be defined by the claims.

What is claimed is:

1. A bicycle light system, comprising:
a multicolor light assembly that projects a first light pattern, a second light pattern, and a third light pattern toward a torso of a person riding a bicycle, the first light pattern having a first light color, the second light pattern having a second light color, and the third light pattern having a third light color, wherein the multicolor light assembly projects the first light pattern, the second light pattern, and the third light pattern to produce an illumination pattern on the torso of the person riding the bicycle, the illumination pattern comprising a red zone provided by the first light pattern, a green zone provided by the second light pattern, a blue zone provided by the third light pattern, and a white zone provided by an overlap of the first light pattern, the second light pattern, and the third light pattern;
a housing unit that supports the multicolor light assembly; and
a mount that secures the housing unit to the bicycle.

2. The bicycle light system according to claim 1, wherein the torso is a front torso of the person, and wherein the multicolor light assembly projects the first light pattern the second light pattern, and the third light pattern toward the front torso of the person riding the bicycle.

3. The bicycle light system according to claim 1, wherein the torso is a rear torso of the person, and wherein the multicolor light assembly projects the first light pattern, the second light pattern, and the third light pattern toward the rear torso of the person riding the bicycle.

4. The bicycle light system according to claim 1, wherein the first light color is red, the second light color is green, and the third light color is blue.

5. The bicycle light system according to claim 1, wherein the illumination pattern further comprises a yellow zone provided by an overlap of the first light pattern and the second light pattern.

6. The bicycle light system according to claim 1, wherein the illumination pattern further comprises a magenta zone provided by an overlap of the first light pattern and the second light pattern.

7. The bicycle light system according to claim 1, wherein the illumination pattern further comprises a cyan zone provided by an overlap of the first light pattern and the second light pattern.

8. The bicycle light system according to claim 1, wherein the illumination pattern further comprises a yellow zone provided by an overlap of the first light pattern and the second light pattern, a magenta zone provided by an overlap of the first light pattern and the third light pattern, and a cyan zone provided by an overlap of the second light pattern and the third light pattern.

9. The bicycle light system according to claim 1, wherein the illumination pattern further comprises a yellow zone provided by an overlap of the first light pattern and the second light pattern, and a magenta zone provided by an overlap of the first light pattern and the third light pattern.

10. The bicycle light system according to claim 1, wherein the illumination pattern further comprises a yellow zone provided by an overlap of the first light pattern and the second light pattern, and a cyan zone provided by an overlap of the second light pattern and the third light pattern.

11. The bicycle light system according to claim 1, wherein the illumination pattern further comprises a cyan zone provided by an overlap of the second light pattern and the third light pattern, and a magenta zone provided by an overlap of the first light pattern and the third light pattern.

12. The bicycle light system according to claim 1, wherein the multicolor light assembly comprises an LED light.

13. The bicycle light system according to claim 12, wherein the LED light comprises a 5 mm RGB LED common cathode.

14. The bicycle light system according to claim 12, wherein the LED light provides a uniform light output.

15. The bicycle light system according to claim 12, wherein the LED light is insulation compatible.

16. The bicycle light system according to claim 12, wherein the LED light comprises a red, green, and blue LED light source.

17. The bicycle light system according to claim 12, wherein the LED light comprises a red LED light source comprising AlGaInP on GaAs substrate, a green light source comprising InGaN on GaAs substrate, and a blue light source comprising InGaAlN on GaAs substrate.

18. The bicycle light system according to claim 1, comprising a power source.

* * * * *